(12) United States Patent
Hayakawa

(10) Patent No.: US 12,074,475 B2
(45) Date of Patent: Aug. 27, 2024

(54) RARE EARTH PERMANENT MAGNET AND ROTATING ELECTRIC MACHINE INCLUDING THE SAME

(71) Applicant: TDK Corporation, Tokyo (JP)

(72) Inventor: Takuma Hayakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 54 days.

(21) Appl. No.: 17/208,185

(22) Filed: Mar. 22, 2021

(65) Prior Publication Data

US 2021/0305852 A1    Sep. 30, 2021

(30) Foreign Application Priority Data

Mar. 25, 2020  (JP) ................. 2020-054504

(51) Int. Cl.
| | |
|---|---|
| H02K 1/02 | (2006.01) |
| H01F 1/057 | (2006.01) |
| H01F 7/02 | (2006.01) |
| H01F 41/02 | (2006.01) |

(52) U.S. Cl.
CPC ............ *H02K 1/02* (2013.01); *H01F 1/0577* (2013.01); *H01F 7/0205* (2013.01); *H01F 41/0293* (2013.01)

(58) Field of Classification Search
None
See application file for complete search history.

(56) References Cited

U.S. PATENT DOCUMENTS

| | | | |
|---|---|---|---|
| 2010/0109468 A1 | 5/2010 | Natsumeda et al. | |
| 2011/0210810 A1* | 9/2011 | Miyata | H01F 1/06 427/127 |
| 2013/0119811 A1* | 5/2013 | Kobayashi | H02K 1/2773 310/156.53 |
| 2017/0076846 A1* | 3/2017 | Tsukamoto | H01F 7/021 |
| 2018/0287441 A1* | 10/2018 | Kitaoka | H02K 9/197 |

FOREIGN PATENT DOCUMENTS

| | | |
|---|---|---|
| JP | 2011-216836 A | 10/2011 |
| JP | 2017-055074 A | 3/2017 |
| WO | WO-2008/123251 A1 | 10/2008 |

* cited by examiner

*Primary Examiner* — Xiaowei Su
(74) *Attorney, Agent, or Firm* — Faegre Drinker Biddle & Reath LLP

(57) ABSTRACT

A rare earth permanent magnet has a first surface and satisfies A1<B1, A1≥C1, and A1≥D1 where A1 is a coercive force of a portion a1 including a center of gravity of the first surface, B1 is a coercive force of a portion b1, C1 is a coercive force of a portion c1, and D1 is a coercive force of a portion d1, and a heavy rare earth element is present on a top layer of the first surface.

8 Claims, 11 Drawing Sheets

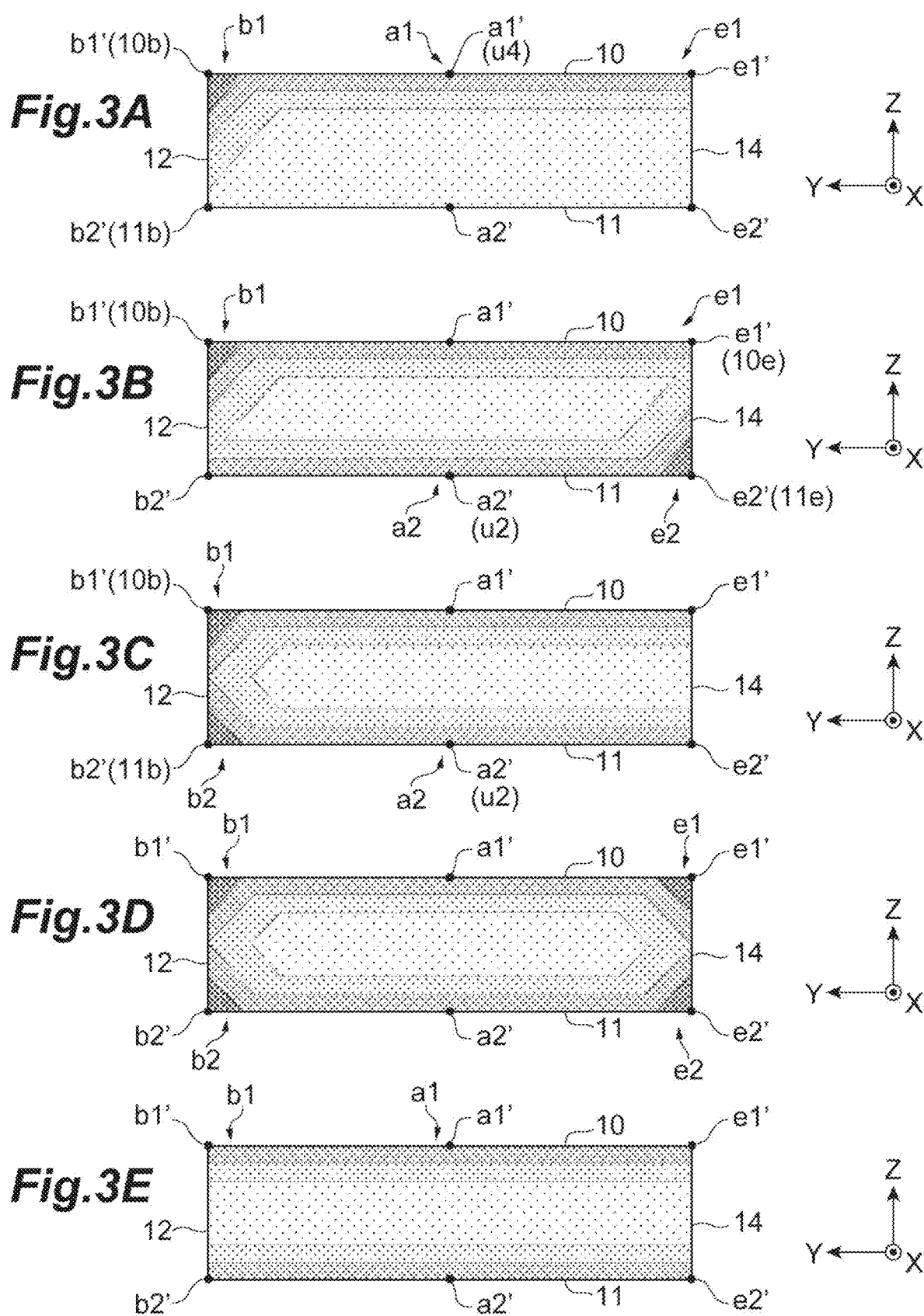

RARE EARTH PERMANENT MAGNET AND ROTATING ELECTRIC MACHINE INCLUDING THE SAME

TECHNICAL FIELD

The present disclosure relates to a rare earth permanent magnet and a rotating electric machine including the same.

BACKGROUND

Conventionally, an R-T-B-based sintered magnet containing a heavy rare earth element has been known in which the heavy rare earth element is applied only on one main surface or two main facing surfaces so that the coercive force of the central portion of the main surface is larger than that of the end portion of the main surface.

CITATION LIST

Patent Literature

Patent Literature 1: Japanese Unexamined Patent Publication No. 2017-55074

SUMMARY

The corrosion resistance on one end surface may desirably be enhanced depending on the application of the magnet.

An object of an aspect of the present invention, which has been made in view of the problem, is to provide a rare earth permanent magnet in which the corrosion resistance at one end surface is enhanced, and a rotating electric machine including the same.

A rare earth permanent magnet according to an aspect of the present invention has a first surface and satisfies A1<B1, A1≥C1, and A1≥D1 where A1 is a coercive force of a portion a1 including a center of gravity of the first surface, B1 is a coercive force of a portion b1 including an end of the first surface, the end being distant from the portion a1 in a Y direction perpendicular to a normal direction at the center of gravity of the first surface, C1 is a coercive force of a portion c1 including an end of the first surface, the end being distant from the portion a1 in a X direction perpendicular to the normal direction at the center of gravity of the first surface and the Y direction, and D1 is a coercive force of a portion d1 including an end of the first surface, the end being distant from the portion a1 in the −X direction opposite to the X direction, and a heavy rare earth element is present on a top layer of the first surface.

According to one or more embodiments, A1<B1 is satisfied, thereby providing a rare earth permanent magnet in which the corrosion resistance at one end portion defined with respect to the Y direction is enhanced.

Regarding the mechanism of occurrence of corrosion in the end portion of a rare earth permanent magnet, and the reason that the corrosion resistance in the end portion of the rare earth permanent magnet is enhanced when the rare earth permanent magnet satisfies A1<B1, the present inventor has the following idea. In particular, the phase present at grain boundaries of the rare earth permanent magnet and having a higher content of rare earth element R (R-rich phase) than the main phase is susceptible to oxidation. R in the R-rich phase at grain boundaries transforms into hydroxide due to water resulting from water vapor in the usage environment, which process generates hydrogen. This process is represented by Formula (I).

$$2R + 6H_2O \rightarrow 2R(OH)_3 + 3H_2 \qquad (I)$$

The generated hydrogen is occluded in the non-corroded R-rich phase. This process is represented by Formula (II).

$$2R + xH_2 \rightarrow 2RH_x \qquad (II)$$

The hydrogen occlusion makes the R-rich phase more susceptible to corrosion, and the corrosion reaction between the hydrogen-occluded R-rich phase and water generates a larger amount of hydrogen than that occluded in the R-rich phase. This process is represented by Formula (III).

$$2RH_x + 6H_2O \rightarrow 2R(OH)_3 + (3+x)H_2 \qquad (III)$$

With the chain reaction of Formulas (I) to (III), corrosion generated in the end portion of the magnet proceeds into the magnet, and the R-rich phase changes to $R(OH)_3$ and $RH_x$. The volume expansion with this change accumulates stress, so that the crystal grains (main phase particles) of the magnet that constitute the main phase drop. A new surface of the magnet emerges due to the drop of particles in the main phase and the corrosion further proceeds into the magnet.

Here, the magnet satisfies A1<B1, meaning that the heavy rare earth element increases in, for example, the R-rich phase in the end portion of the magnet, which enhances the corrosion potential at the new alloy surface of the R-rich phase. Hence, hydrogen generation in Formula (I) is suppressed, which makes the reaction in Formula (II) or later less likely to occur, and improves the corrosion resistance of the magnet in the end portion in the +Y direction Further, the magnet may satisfy B1−A1≥10 kA/m.

Further, the magnet has a second surface facing the first surface, the second surface having a top layer containing a heavy rare earth element, and the magnet may satisfy A2≥C2 and A2≥D2 where A2 is a coercive force of a portion including a center of gravity of the second surface, C2 is a coercive force of a portion c2 including an end of the second surface, the end being distant from the portion a2 including the center of gravity of the second surface, in the X direction, and D2 is a coercive force of a portion d2 including an end of the second surface, the end being distant from the portion a2 including the center of gravity of the second surface, in the −X direction.

Further, when the magnet has a second surface facing the first surface, a heavy rare earth element is present on the entire second surface, and A2≥C2 and A2≥D2 are satisfied, the magnet may satisfy A2<B2 where B2 is a coercive force of a portion b2 including an end of the second surface, the end being distant from the portion a2 including the center of gravity of the second surface, in the Y direction.

Further, when the magnet has a second surface facing the first surface, a heavy rare earth element is present on the entire second surface, and A2≥C2 and A2≥D2 are satisfied, the magnet may satisfy A2<E2 where E2 is a coercive force of a portion e2 including an end of the second surface, the end being distant from the portion a2 including the center of gravity of the second surface, in a −Y direction opposite to the Y direction.

Further, the magnet may satisfy A1<E1 where E1 is a coercive force of a portion e1 including an end of the first surface, the end being distant from the portion including the center of gravity of the first surface, in the −Y direction opposite to the Y direction.

Further, the Y direction may be a longitudinal direction of the first surface.

Further, a normal direction at the center of gravity of the first surface may be parallel to a c-axis of the magnet.

A rotating electric machine according to an aspect of the present invention includes a rotor, a stator, and the magnet provided in the rotor or the stator.

Advantageous Effects of Invention

According to an aspect of the present invention, a rare earth permanent magnet is provided that has enhanced corrosion resistance at one end surface, and a rotating electric machine including the same.

BRIEF DESCRIPTION OF THE DRAWINGS

FIG. 3A is a schematic view showing the coercive force distribution in the ZY cross section of the rare earth permanent magnet according to a first embodiment, and the darker the color, the stronger the coercive force;

FIG. 3B is a schematic view showing the coercive force distribution in the ZY cross section of the rare earth permanent magnet according to a second embodiment, and the darker the color, the stronger the coercive force;

FIG. 3C is a schematic view showing the coercive force distribution in the ZY cross section of the rare earth permanent magnet according to a third embodiment, and the darker the color, the stronger the coercive force;

FIG. 3D is a schematic view showing the coercive force distribution in the ZY cross section of the rare earth permanent magnet according to a fourth embodiment, and the darker the color, the stronger the coercive force;

FIG. 3E is a schematic view showing the coercive force distribution in the ZY cross section of the rare earth permanent magnet according to a prior art, and the darker the color, the stronger the coercive force;

DETAILED DESCRIPTION

Figure 1:
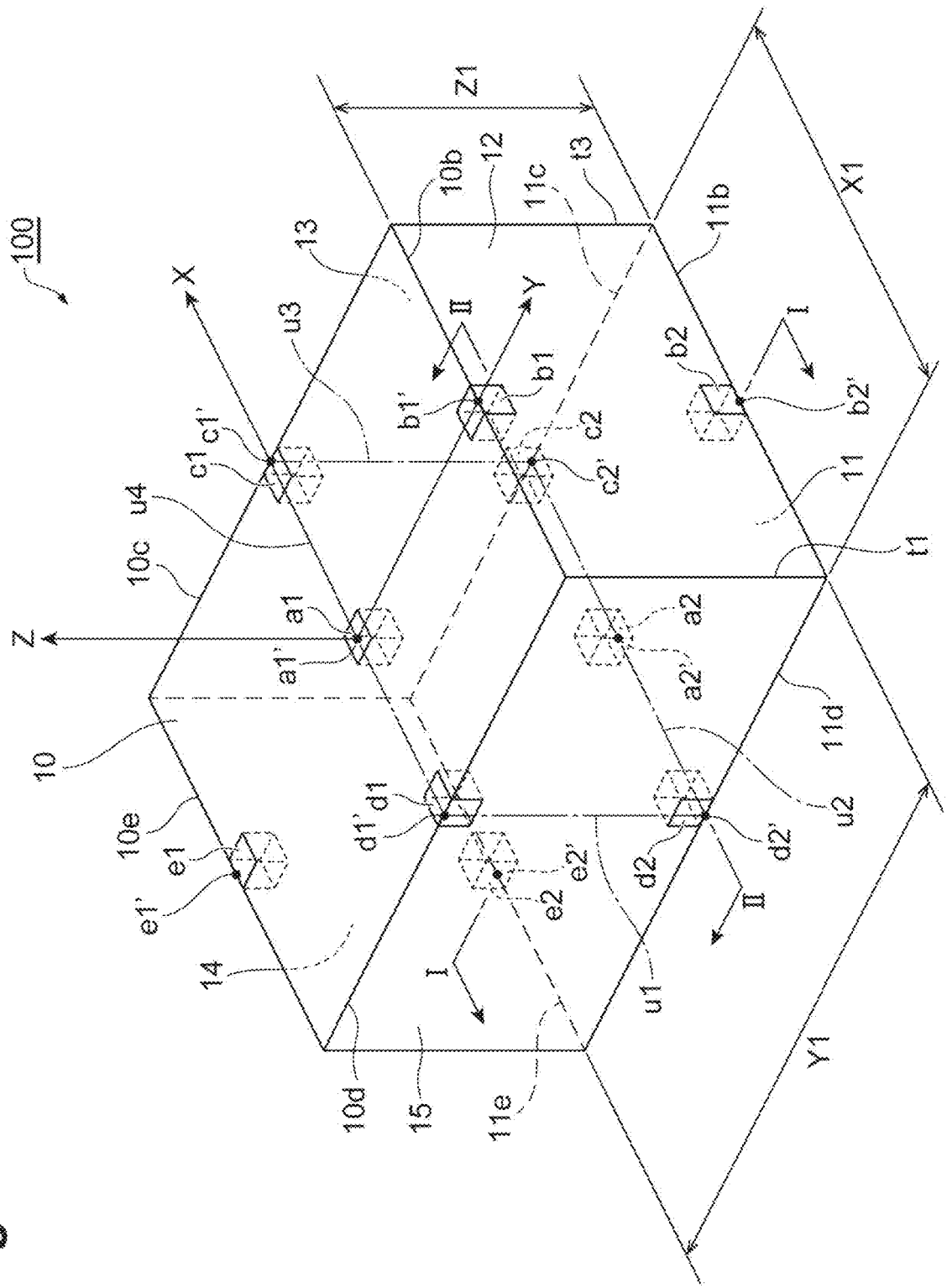
FIG. 1 is an external view showing a rare earth permanent magnet according to a first embodiment of the present invention.

Preferred embodiments of the present invention will now be described with reference to the accompanying drawings. In the drawings, the same components are designated by the same reference numerals. The present invention is not limited to the embodiments described below.

<Rare Earth Permanent Magnet>

First Embodiment

FIG. 1 is an external view showing a rare earth permanent magnet 100 (hereinafter also referred to as "magnet 100") according to the first embodiment. As shown in FIG. 1, the magnet 100 according to this embodiment has a rectangular parallelepiped shape. The magnet 100 has a first surface 10 located in the XY plane where Z=0, a second surface 11 located parallel to the XY plane and facing the first surface 10, and four side surfaces (end surfaces) 12 to 15 perpendicular to the XY plane.

The first surface (main surface) 10 and the second surface (main surface) 11 each have a rectangular shape that has a long side extending in the Y direction and a short side extending in the X direction which are orthogonal to the Z direction and face each other. The side surfaces 13 and 15 are located parallel to the ZY plane and face each other, and the side surfaces 12 and 14 are located parallel to the XZ plane and face each other.

The first surface 10 and the second surface 11 have a larger area than any of the side surfaces 12 to 15. The first surface 10 has short sides 10b and 10e and long sides 10c and 10d. The second surface 11 has short sides 11b and 11e and long sides 11c and 11d.

Here, a portion including the center of gravity a1' of the first surface 10 is defined as a central portion a1, a portion including an end distant from the central portion a1 in the Y direction is defined as an end portion b1, a portion including an end distant from the central portion a1 in the −Y direction is defined as an end portion e1, a portion including an end distant from the central portion a1 in the X direction is defined as an end portion c1, and a portion including an end distant from the central portion a1 in the −X direction is defined as an end portion d1.

Similarly, a portion including the center of gravity a2' of the second surface 11 is defined as a central portion a2, a portion including an end distant from the central portion a2 in the Y direction is defined as an end portion b2, a portion including an end distant from the central portion a2 in the −Y direction is defined as an end portion e2, a portion including an end distant from the central portion a2 in the X direction is defined as an end portion c2, and a portion including an end distant from the central portion a2 in the −X direction is defined as an end portion d2.

In the magnet 100 shown in FIG. 1, the end portion b1 is a portion including the midpoint b1' of the side 10b. The end portion c1 is a portion including the midpoint c1' of the side 10c. The end portion d1 is a portion including the midpoint d1' of the side 10d. The end portion e1 is a portion including the midpoint e1' of the side 10e.

In the magnet 100 shown in FIG. 1, the end portion b2 is a portion including the midpoint b2' of the side 11b. The end portion c2 is a portion including the midpoint c2' of the side 11c. The end portion d2 is a portion including the midpoint d2' of the side 11d. The end portion e2 is a portion including the midpoint e2' of the side 11e.

The magnet 100 contains a rare earth element R, a transition metal element T, and boron B, and is an R-T-B-based sintered magnet having grains (main phase crystal grains) composed of $R_2T_{14}B$ crystals and grain boundaries present between the adjacent main phase crystal grains. Note that the magnet 100 is not limited to the R-T-B-based sintered magnet, and may be, for example, a samarium-cobalt magnet, a samarium-iron-nitrogen magnet, or a praseodymium magnet.

For the magnet 100, R represents at least one rare earth element. The rare earth element refers to Sc, Y, and a lanthanoid element that belong to Group 3 of the long periodic table. Examples of the lanthanoid element include La, Ce, Pr, Nd, Sm, Eu, Gd, Tb, Dy, Ho, Er, Tm, Yb and Lu. Rare earth elements are classified into light rare earth elements and heavy rare earth elements. Heavy rare earth elements are Gd, Tb, Dy, Ho, Er, Tm, Yb, and Lu, and light rare earth elements are other rare earth elements.

In the magnet 100, the R content may be 28.0 mass % or more and 33.0 mass % or less, may be 29.0 mass % or more and 32.0 mass % or less. With the R content within this range, the residual magnetic flux density (Br) and the coercive force (HcJ) are improved.

In the magnet 100, T represents Fe or one or more transition metal elements including Fe and Co. T may be Fe alone or may have Fe partially replaced with Co.

In the magnet 100, the Fe content is the substantial residue of the components of the magnet 100.

When the magnet 100 contains Co, the Co content may be 0.3 mass % or more and 5 mass % or less, may be 0.4 mass % or more and 2.5 mass % or less. With the Co content within this range, the coercive force and the corrosion resistance are enhanced.

Examples of transition metal elements other than Fe and Co include Ti, V, Cu, Cr, Mn, Ni, Zr, Nb, Mo, Hf, Ta, and W. Besides the transition metal element, T may further include at least one element selected from the group consisting of, for example, Al, Ga, Si, Bi, and Sn.

In the magnet 100, regarding B, part of B can be replaced with carbon (C). In this case, the magnet can be easily manufactured, and the manufacturing cost can be reduced. The amount of C replaced is set to be an amount that does not substantially affect the magnetic characteristics. Besides, O, C, Ca, and the like may be inevitably mixed.

In the magnet 100, the B content may be 0.70 mass % or more and 1.10 mass % or less, may be 0.75 mass % or more and 1.05 mass % or less, may be 0.80 mass % or more and 1.00 mass % or less. With the B content within this range, the residual magnetic flux density and the coercive force are improved.

In the magnet 100, the C content changes depending on other parameters and is determined as appropriate. The magnet 100 may further contain Cu, Al, or the like. Adding these elements makes it possible to increase the coercive force and the corrosion resistance, and improve the temperature characteristics.

In the magnet 100, a heavy rare earth element is present in the top layer of the first surface 10. To be specific, for example, the heavy rare earth element is present in the top layer of the first surface 10, especially at grain boundaries in the top layer, in the central portion a1, the end portion b1 distant from the central portion a1 in the Y direction, the end portion e1 distant from the central portion a1 in the −Y direction, the end portion c1 distant from the central portion a1 in the X direction, and the end portion d1 distant from the central portion a1 in the −X direction in the first surface 10, and the four corners of the first surface 10. Note that the heavy rare earth element may or may not be present inside the crystal grains forming the main phase of the first surface 10. A top layer refers to a region from the magnet surface to a depth of 0.5 mm.

The magnet 100 may be a rare earth permanent magnet in which the grain boundary of the heavy rare earth element diffuses from the first surface 10 to inside of the magnet. The magnet 100 in which the grain boundary diffusion of the heavy rare earth element occurs can be improved in coercive force with a smaller amount of heavy rare earth element than the magnet 100 having no grain boundary diffusion.

Figure 2A:
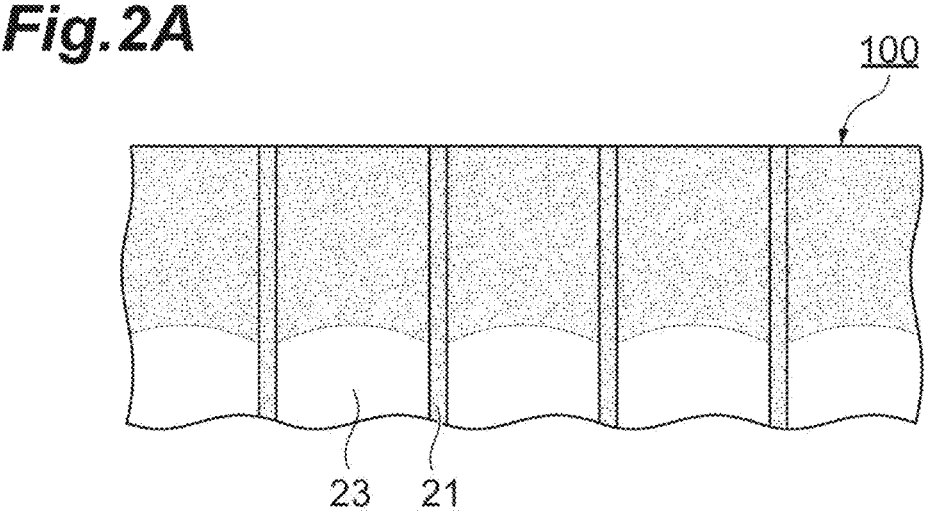
FIG. 2A is a schematic view showing how elements diffuse into grain boundaries and crystal grains of a rare earth permanent magnet.
Figure 2B:
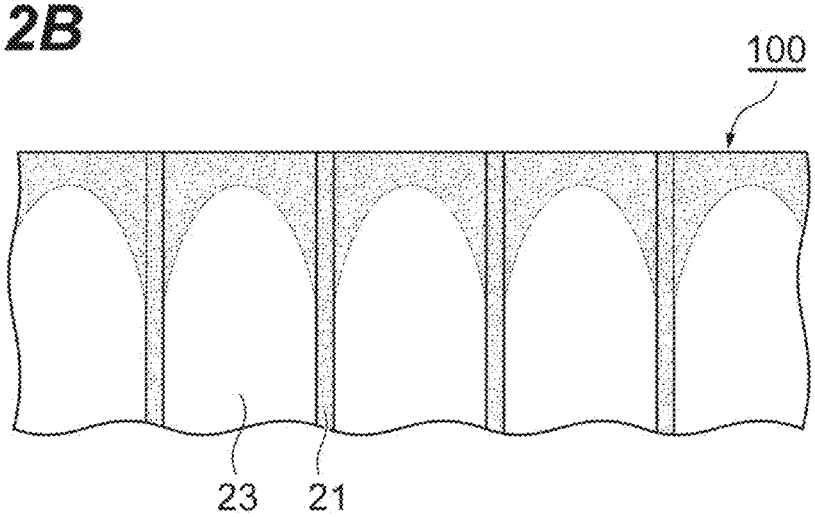
FIG. 2B is a schematic view showing how elements diffuse into grain boundaries and crystal grains of a rare earth permanent magnet.
Figure 2C:
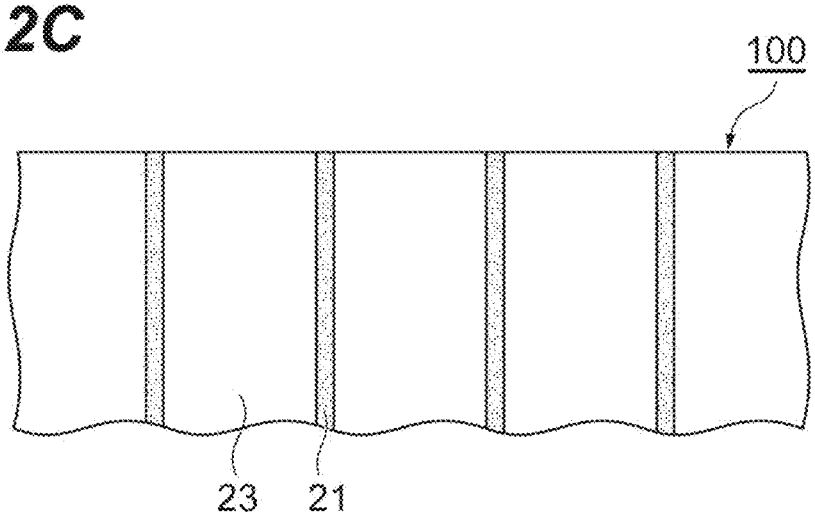
FIG. 2C is a schematic view showing how elements diffuse into grain boundaries and crystal grains of a rare earth permanent magnet.

Regarding grain boundary diffusion, Harrison's diffusion classification model is known which models the state of diffusion. According to Harrison's diffusion classification model, diffusion is classified into Type A, Type B, and Type C. FIGS. 2A to 2C are schematic views showing how elements diffuse into grain boundaries 21 and crystal grains 23 of the magnet 100. FIG. 2A shows Type A, FIG. 2B shows Type B, and FIG. 2C shows Type C. The hatched portion in each drawing represents the portion in which the heavy rare earth element has diffused. In FIGS. 2A to 2C, the elements are diffused from the top to the bottom to the viewer.

As shown in FIG. 2A, in the case of Type A, the heavy rare earth element diffuses into the grain boundaries 21 and the crystal grains 23. In other words, in the case of Type A, diffusion into particles proceeds. On the other hand, as shown in FIG. 2C, in the case of the Type C, the heavy rare earth element does not diffuse into the crystal grains 23, but the heavy rare earth element diffuses only into the grain boundaries 21. As shown in FIG. 2B, the case of Type B is intermediate between the case of Type A and the case of Type C.

The concentration of the heavy rare earth element (at least one of Dy and Tb) at the grain boundaries 21 may be higher than the concentration of the heavy rare earth element in the crystal grains 23, and the heavy rare earth element may diffuse only to the grain boundaries 21 and the surface of the crystal grains 23. Therefore, Type B or Type C, particularly Type C may be dominant for the diffusion. When the concentration of the heavy rare earth element at the grain boundaries 21 is high, the coercive force can be efficiently enhanced with a small amount of heavy rare earth element. In this specification, the concentration of the heavy rare earth element refers to the mass concentration of heavy rare earth element unless otherwise specified.

In the first embodiment, in the magnet 100, no heavy rare earth element is present at the grain boundaries in the top layer of the second surface 11.

A conventionally known method can be used as a method for measuring various components contained in the magnet 100. The amounts of various metal elements may be measured by X-ray fluorescence analysis (XRF). The oxygen content may be measured by the inert gas fusion and non-dispersive infrared absorption method. The carbon content may be measured by the oxygen stream combustion and infrared absorption method. When the sample for measurement is small or the content of the metal element is low, inductively coupled plasma atomic emission spectroscopy (ICP-AES) may be used.

In one embodiment, the magnetization easy axis (c-axis) of the magnet 100 may be parallel to the Z direction that is the normal to the center of gravity a1', that is, perpendicular to the first surface 10, while in another embodiment, may be perpendicular to the Z direction (for example, parallel to the Y direction or parallel to the X direction), or may be oblique to the Z direction.

The size of the magnet 100 is not limited to a particular one and can be changed as appropriate according to the application. The length X1 in the X-direction of the magnet 100 may be in the range of 1 to 100 mm, the length Y1 in the Y-direction may be in the range of 10 to 300 mm, and the thickness Z1 in the Z-direction may be in the range of 0.5 to 30 mm or 1 to 15 mm. The magnet 100 may be a cube.

FIG. 3A is a schematic view showing the distribution of coercive force at the cross section of the magnet 100 in the first embodiment taken along a ZY plane, where x=0, including the central portions a1 and a2 and the end portions b1, e1, b2, and e2 of FIG. 1.

Note that FIGS. 3A to 3E and FIGS. 4A and 4B to be described later show that the darker the black (the more dots) the higher the coercive force and the lighter the black (the less dots) the lower the coercive force. The shades of black (the number of dots) indicate the magnitude of relative coercive force in a plurality of spots in each drawing. The shades of black (the number of dots) do not indicate the relative magnitude of the coercive force between different drawings.

In this embodiment, at the ZY cross section, in and around the first surface 10, there is a region (gradient structure region) in which the coercive force and the concentration of the heavy rare earth element increase toward the first surface 10. From the midpoint e1' (end portion e1) to just before the midpoint b1' (end portion b1) through the center of gravity a1' (central portion a1) in the gradient structure region, the coercive force in substantially the Y direction and the concentration of the heavy rare earth element are constant (the coercive force is ±9 kA/m and the concentration of the heavy rare earth element is ±10%), but the coercive force and the concentration of the heavy rare earth element in the end portion b1 are higher than these constant values, and in the end portion b1, the gradient structure extends deeper in the −Z direction than the other portions.

In other words, the magnet 100 satisfies A1<B1, where the coercive force in the central portion a1 of the first surface 10 is A1, and the coercive force in the end portion b1 including the end of the first surface that is distant from the central portion a1 in the Y direction perpendicular to the normal Z direction of the center of gravity a1' is B1.

Since the corrosion resistance in the end portions can be further improved, B1-A1 may be 10 kA/m or more, 15 kA/m or more, or 20 kA/m or more.

Such a situation is satisfied not only at the ZY cross section where x=0 but also at other ZY cross sections parallel to the ZY cross section where x=0. In other words, assuming that the line u4 on the X-axis that connects the midpoint d1' of the side 10d and the midpoint c1' of the side 10c in FIG. 1 is equally divided into n and the coercive force of a portion including each line component is defined as $A1_n$, and the side 10b of the first surface 10 is equally divided into n and the coercive force of a portion including each line component is defined as $B1_n$, comparing them in positions aligned on the same X-axis shows that, even out of the central portion a1, $A1_n < B1_n$ in positions of the line components aligned on the same X-axis. The difference preferably satisfies the aforementioned equation.

The coercive force and the concentration of the heavy rare earth metal element in the portion including the side 10b such as the end portion b1 are higher than the coercive force and the concentration of the heavy rare earth metal element in the portion including the X-axis such as the central portion a1. In response to this, the coercive force and the heavy rare earth metal element concentrations from the side 10b to the side 11b, for example, to the center of the Z-direction thickness, are higher at the end surface 12 side when comparing the portions of the side surface 12 (which can be obtained by division along the XZ direction a grid pattern) with the portions including the ZX cross section of the central portion (y=0) in the corresponding positions distant in the Y direction.

Figure 4A:
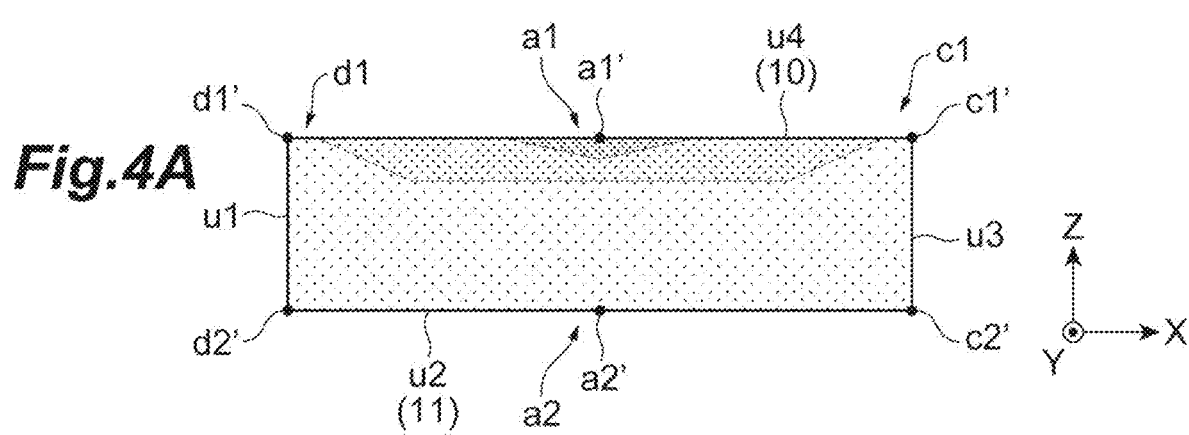
FIG. 4A is a schematic view showing the coercive force distribution in the ZX cross section of the rare earth permanent magnet according to the first embodiment, and the darker the color, the stronger the coercive force.

FIG. 4A is a schematic view showing the distribution of coercive force at the cross section of the magnet 100 in the first embodiment taken along a XZ plane, where y=0, including the central portions a1 and a2 and the end portions c1, d1, c2, and d2 of FIG. 1.

In this embodiment, at the cross section, the coercive force in the central portion a1 including the center of gravity a1' of the first surface 10 is higher than or equal to the coercive force in the end portion d1 including the midpoint d1' and the end portion c1 including the midpoint c1'. This is related to the fact that the concentration of the heavy rare earth element in the end portions c1 and d1 is lower than or equal to the concentration of the heavy rare earth element in the central portion a1. The coercive force in the central portion a1 of the first surface 10 can exceed the coercive force in both end portions d1 and c1. This results from the fact that the concentration of the heavy rare earth element in the central portion a1 is higher than that in the end portions c1 and d1.

The magnet 100 of this embodiment satisfies A1≥C1 and A1≥D1 where the coercive force of the end portion c1 including the end of the first surface 10 distant from the central portion a1 in the X direction perpendicular to the normal Z direction and the Y direction of the center of gravity a1' is defined as C1, and the coercive force of the end portion d1 including the end of the first surface 10 distant from the central portion a1 in the −X direction that is opposite to the X direction is defined as D1.

A1 and C1 may satisfy A1−C1≥10 kA/m, A1−C1≥20 kA/m, or A1−C1≥30 kA/m.

A1 and D1 may satisfy A1−D1≥10 kA/m, A1−D1≥20 kA/m, or A1−D1≥30 kA/m.

Note that the relationships represented by A1≥C1 and A1≥D1 are satisfied not only in the ZX cross section where y=0 but also at other ZX cross sections parallel to the ZX cross section where y=0.

The heavy rare earth metal element is not substantially present in the second surface 11 or has substantially the same concentration in the surface, and the coercive forces in the central portion a2 and both end portions b2, e2, c2, and d2 are substantially the same (the coercive force is ±9 kA/m, and the heavy rare earth element concentration is ±10%), and are equivalent to the coercive force in the central portion a2 in the Z direction (thickness direction).

In this specification, there is no limitation on the size or shape of a portion of a magnet (which may be referred to as a chip) in which the coercive force or the concentration of the heavy rare earth metal element is defined, such as a portion including the center of gravity, an end, or a corner of the first surface or the second surface.

Figure 5:
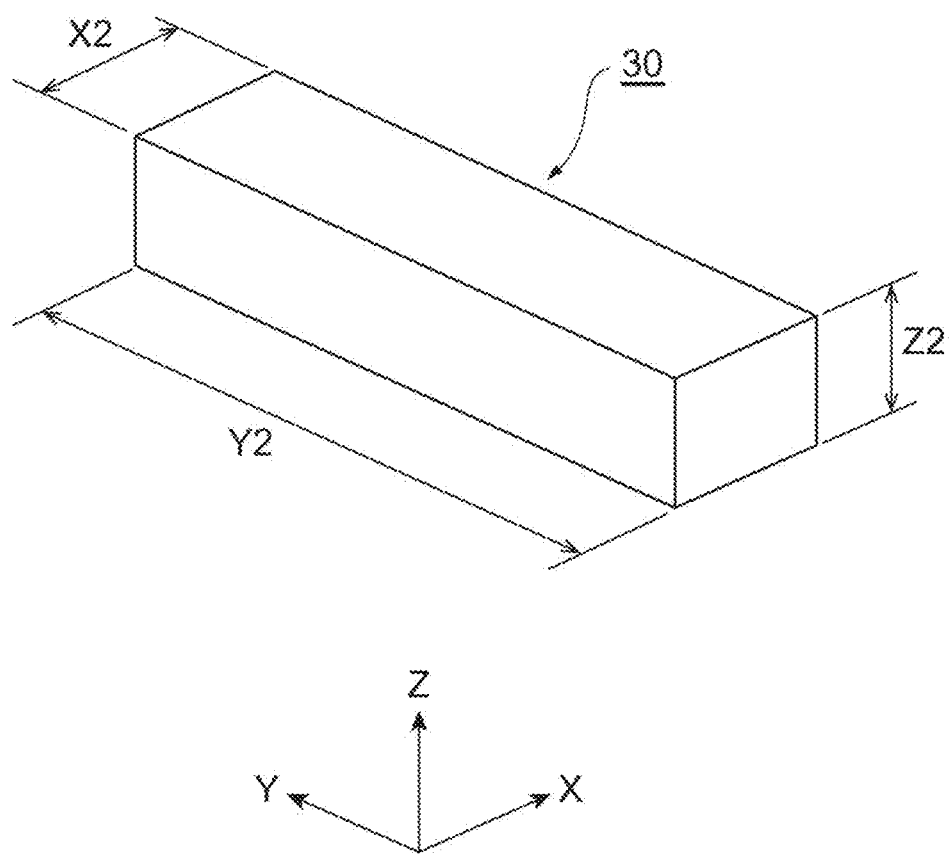
FIG. 5 is a schematic perspective view showing a chip, according to this embodiment, for measuring coercive force.

The shape of the chip is not limited to a particular shape and may be, for example, a rectangular parallelepiped as shown in FIG. 5. The thickness Z2 of the chip 30 is, for example, 0.5 to 10 mm. The length of one side X2 and the other side Y2 may be 0.5 to 10 mm. The volume can be, for example, 1/1000 to 1/10 of the magnet.

(Effects)

According to the first embodiment, compared to prior techniques, the corrosion resistance in the end surface 12 can be selectively made higher than those in other end surfaces. For this reason, when the magnet is positioned so that the end surface that is most susceptible to corrosion during use of the magnet is the end surface 12, the corrosion resistance of the magnet can be increased.

Figure 4B:
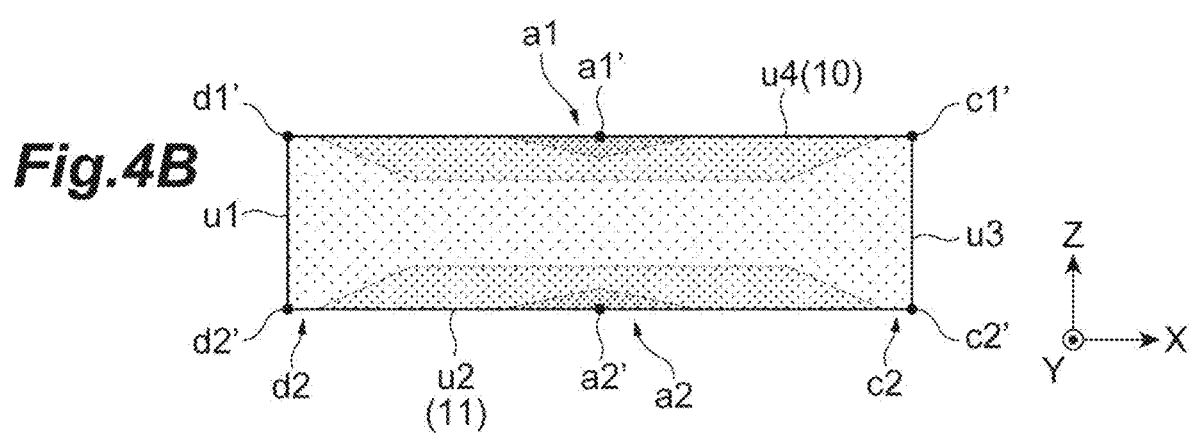
FIG. 4B is a schematic view showing the coercive force distribution in the ZX cross section of the rare earth permanent magnet according to the second to fourth embodiments, and the darker the color, the stronger the coercive force.

Even a conventional R-T-B magnet that has the structure shown in FIG. 4B at the XZ cross section is as shown in FIG. 3E at the ZY cross section and does not satisfy A1<B1.

Second Embodiment

The magnet according to this embodiment differs from the magnet according to the first embodiment in the distribution of coercive force, that is, the distribution of the heavy rare earth element.

FIG. 3B is a schematic view showing the distribution of coercive force at the cross-section of the magnet 100 in the second embodiment taken along a ZY plane, where x=0, including the central portions a1 and a2 and the end portions b1, e1, b2, and e2 of FIG. 1.

In this embodiment, the gradient structure of coercive force and the like on the first surface 10 side at the cross section is the same as in the first embodiment.

At the ZY cross section, in and around the second surface 11, there is also a region (gradient structure region) in which the coercive force and the concentration of the heavy rare earth element increase toward the second surface 11. From the midpoint b2' (end portion b2) to just before the midpoint e2' (end portion e2) through the center of gravity a2' (central portion a2) in the gradient structure region, the coercive force in substantially the Y direction and the concentration of the heavy rare earth element are constant (the coercive force is ±9 kA/m and the concentration of the heavy rare earth element is ±10%), but the coercive force and the concentration of the heavy rare earth element in the end portion e2 are higher than these constant values, and in the end portion e2, the gradient structure extends deeper in the +Z direction than the other portions.

In other words, the magnet 100 satisfies A2<E2, where the coercive force in the central portion a2 of the second surface 11 is A2, and the coercive force in the end portion e2 of the second surface distant from the central portion a2 in the −Y direction is E2.

E2-A2 may be 10 kA/m or more, 15 kA/m or more, 20 kA/m or more.

Such a situation is satisfied not only at the ZY cross section where x=0 but also at other ZY cross sections parallel to the ZY cross section where x=0. In other words, assuming that the line u2 parallel with the X-axis that connects the midpoint d2' of the side 11d and the midpoint c2' of the side 11c is equally divided into n (for example, 10) and the coercive force of a portion including each line component is defined as $A2_n$, and the side 11e of the end surface 14 is equally divided into n and the coercive force of a portion including each line component is defined as $E2_n$, comparing them in positions aligned on the same X-axis shows that, even out of the central portion a2, $A1_n < E2_n$ in positions of the line components aligned on the same X-axis. The difference may satisfy the aforementioned equation.

The coercive force and the concentration of the heavy rare earth metal element in the portion including the side 11e such as the end portion e2 are higher than the coercive force and the concentration of the heavy rare earth metal element in the portion including the line u2 parallel with the X-axis such as the central portion a2. In response to this, the coercive forces and the heavy rare earth metal element concentrations from the side 11e to the side 10e, for example, to the center of the Z-direction thickness, are higher at the end surface 14 side when comparing the portions of the end surface 14 with the portions including the ZX cross section of the central portion (y=0) in the corresponding positions distant in the Y direction shows that the end surface 14 side is at a higher level.

FIG. 4B is a schematic view showing the distribution of coercive force at the cross-section of the magnet 100 in the second embodiment taken along a XZ plane, where y=0, including the central portions a1 and a2 and the end portions c1, d1, c2, and d2 in FIG. 1.

In this embodiment, the coercive force and the distribution of the heavy rare earth element on the first surface 10 side are the same as in the first embodiment.

In this embodiment, at the cross section, the coercive force of the central portion a2 of the second surface 11 is higher than or equal to the coercive force in both the end portions d2 and c2. This results from the fact that the concentration of the heavy rare earth element in the end portions c2, and d2 is lower than or equal to the concentration of the heavy rare earth element in the central portion a2. The coercive force in the central portion a2 of the second surface 11 can exceed the coercive force in both end portions d2 and c2. This results from the fact that the concentration of the heavy rare earth element in the central portion a2 is higher than that in the end portions c2, and d2.

The magnet 100 of this embodiment satisfies A2≥C2 and A2≥D2 where the coercive force of the end portion c2 of the second surface 11 distant from the central portion a2 in the X direction perpendicular to the normal Z direction and the Y direction of the center of gravity a2' is defined as C2, and the coercive force of the end portion d2 including the end of the second surface distant from the central portion a2 in the −X direction that is opposite to the X direction is defined as D2.

A2 and C2 may satisfy A2−C2≥10 kA/m, A2−C2≥20 kA/m, or A2−C2≥30 kA/m.

A2 and D2 may satisfy A2−D2≥10 kA/m, A2−D2≥20 kA/m, or A2−D2≥30 kA/m.

Note that the relationships represented by A2≥C2 and A2≥D2 are satisfied not only in the ZX cross section where y=0 but also in other ZX cross sections parallel to the ZX cross section where y=0.

In the magnet 100 in the second embodiment, a heavy rare earth element is present in the top layer of the second surface 11, especially at the grain boundaries of the top layer. To be specific, for example, the heavy rare earth element is present at grain boundaries in the top layer of the second surface 11, in the central portion a2, the end portion b2 on the Y direction, the end portion e2 on the −Y direction, the end portion c2 on the X direction, and the end portion d2 on the −X direction, and the four corners of the second surface. Note that the heavy rare earth element may or may not be present inside the crystal grains forming the main phase of the second surface 11. The magnet 100 may be a rare earth permanent magnet involving the inward grain boundary diffusion of the heavy rare earth element from the second surface 11.

According to this embodiment, the corrosion resistance in the end surfaces 12 and 14 can be selectively made high. For this reason, the durability of the magnet can be increased by positioning the magnet so that the surface most susceptible to corrosion during use becomes the end surface 12 and/or the end surface 14.

Third Embodiment

The magnet according to this embodiment differs from the magnet according to the second embodiment in the distribution of the coercive force on the second surface 11 side, that is, the distribution of the heavy rare earth element.

FIG. 3C is a schematic view showing the distribution of coercive force at the cross section of the magnet 100 in the third embodiment taken along a ZY plane, where x=0, including the central portions a1 and a2 and the end portions b1, e1, b2, and e2 in FIG. 1.

In this embodiment, the gradient structure of coercive force and the like on the first surface 10 side at the cross section is the same as in the first and second embodiments. Moreover, in and around the second surface 11, there is also a gradient structure region in which the coercive force and the concentration of the heavy rare earth element increase toward the second surface 11. Here, from the midpoint e2' (end portion e2) to the midpoint b2' (end portion b2) through the center of gravity a2' (central portion a2) in the gradient structure region, the coercive force in substantially the Y direction and the concentration of the heavy rare earth element are constant (the coercive force is ±9 kA/m and the concentration of the heavy rare earth element is ±10%), but the coercive force and the concentration of the heavy rare earth element in the end portion b2 are higher than these constant values, and in the end portion b2, the gradient structure extends deeper in the +Z direction than the other portions.

In other words, the magnet 100 satisfies A2<B2, where the coercive force in the central portion a2 of the second surface 11 is A2, and the coercive force in the end portion b2 of the second surface 11 distant from the central portion a2 in the Y direction is B2.

Since the corrosion resistance in the end portions can be further improved, B2−A2 may be 10 kA/m or more, may be 15 kA/m or more, may be 20 kA/m or more.

Such a situation is satisfied not only at the ZY cross section where x=0 but also at other ZY cross sections parallel to the ZY cross section where x=0. In other words, assuming that the line u2 parallel with the X-axis that connects the midpoint d2' of the side 11*d* and the midpoint c2' of the side 11*c* is equally divided into n and the coercive force of a portion including each line component is defined as $A2_n$, and the side 11*b* of the end surface 12 is equally divided into n and the coercive force of a portion including each line component is defined as $B2_n$, comparing them in positions on the same X-axis shows that, even out of the central portion a2, $A2_n < B2_n$ in positions of the line components on the same X-axis. The difference may satisfy the aforementioned equation.

The coercive force and the concentration of the heavy rare earth metal element in the portion including the side 11*b* such as the end portion b2 are higher than the coercive force and the concentration of the heavy rare earth metal element in the portion including the line u2 parallel with the X-axis such as the central portion a2. In response to this, the coercive forces and the heavy rare earth metal element concentrations from the side 11*b* to the side 10*b*, for example, to the center of the Z-direction thickness, are higher at the end surface 12 side when comparing with the portions including the ZX cross section of the central portion (y=0) in the corresponding positions distant in the Y direction.

The distribution of coercive force at the cross section of the magnet 100 in the third embodiment taken along a XZ plane, where y=0, including the central portions a1 and a2 and the end portions c1, d1, c2, and d2 in FIG. 1 is as shown in FIG. 4B and is the same as in the second embodiment.

According to this embodiment, the corrosion resistance in the end surface 12 can be selectively made high. For this reason, the durability of the magnet can be increased by positioning the magnet so that the surface most susceptible to corrosion during use becomes the end surface 12.

Fourth Embodiment

The magnet according to this embodiment differs from the magnet according to the third embodiment in the distribution of the coercive force in the end portion on the −Y side, that is, the distribution of the heavy rare earth element.

FIG. 3D is a schematic view showing the distribution of coercive force at the cross section of the magnet 100 in the fourth embodiment taken along a ZY plane, where x=0, including the central portions a1 and a2 and the end portions b1, e1, b2, and e2 in FIG. 1.

In this embodiment, the coercive force and the gradient distribution of the heavy rare earth element on the +Y side of the magnet are the same as in the third embodiment.

In this embodiment, the coercive force and the gradient distribution of the heavy rare earth element on the −Y side of the magnet are also the same as on the +Y side in the third embodiment.

According to this embodiment, the corrosion resistance in the end surfaces 12 and 14 can be selectively made higher than those in the other end surfaces. For this reason, the durability of the magnet can be increased by positioning the magnet so that the surface most susceptible to corrosion during use becomes the end surface 12 and/or the end surface 14.

(Modification)

The magnet according to the present invention is not limited to the aforementioned embodiments and various modifications can be made.

In the aforementioned embodiments, in the magnet 100 shown in FIG. 1, the X direction is the lateral direction of the first surface 10 and the second surface 11, and the Y direction is the longitudinal direction of the first surface 10 and the second surface 11. However, in the magnet 100, the X direction and the Y direction can be arbitrarily determined; for instance, the X direction may be the longitudinal direction of the first surface 10 and the second surface 11, and the Y direction may be the lateral direction of the first surface 10 and the second surface 11.

Aside from that, the first surface may not be the main surface 10, but the side surface (end surface) 12 or 14 or the side surface 13 or 15 may be the main surface. In any case, the portion that requires corrosion resistance may be the surface exposed in the Y direction.

In addition, the shape of the magnet may not necessarily be a rectangular parallelepiped.

Figure 6A:
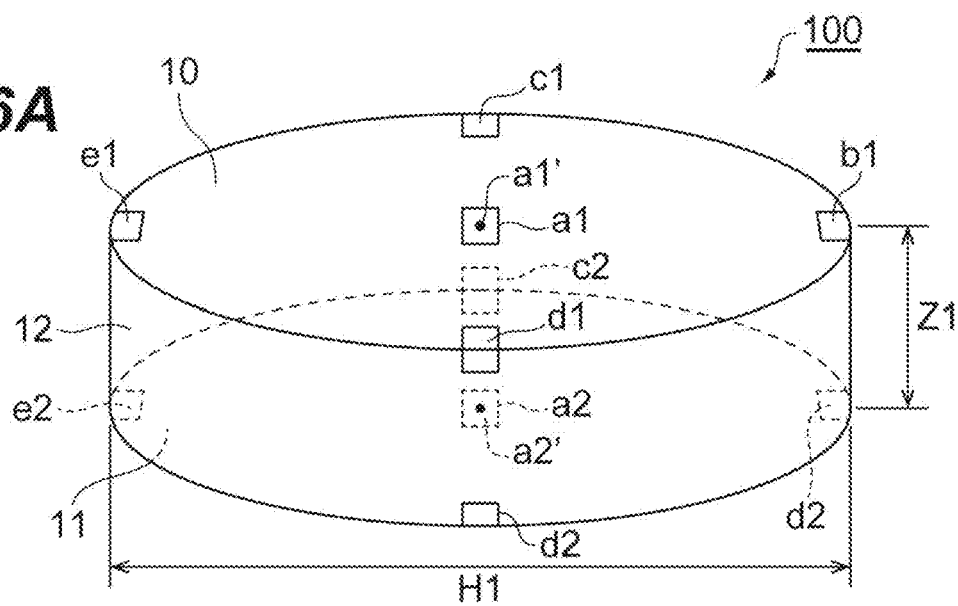
FIG. 6A is a schematic view showing a rare earth permanent magnet according to a modification of the present invention.

For instance, of the side surfaces 12 to 15, any two opposing side surfaces may be parallel to each other or may not be parallel to each other. To be specific, as shown in FIG. 6A, the magnet may be a circular plate (circular cylinder). The thickness Z1 of the circular cylinder in the Z direction may be 1.5 to 9 mm or 2 to 7 mm. The diameter H1 of the first surface 10 and the second surface 11 may be 10 to 100 mm.

Even in this case, a coordinate system is given in which the central portion a1 is provided in the portion including the center of gravity a1' of the first surface 10, the central portion a2 is provided in the portion including the center of gravity a2' of the second surface 11, and the normal line of the center of gravity a1' extends in the Z direction, and arbitrary directions are defined as the X and Y directions, and the end portions b1 to e1 and the end portions b2 to e2 can be defined as shown in FIG. 6A, as in the case of the rectangular parallelepiped.

The parts and size in such a case can be determined as appropriate as described above, and can be modified as appropriate according to the shape of the edge of the chip including ends.

The first surface 10 and the second surface 11 may be parallel to each other or may not be parallel to each other. The first surface 10 and/or the second surface 11 may be curved surfaces.

Figure 6B:
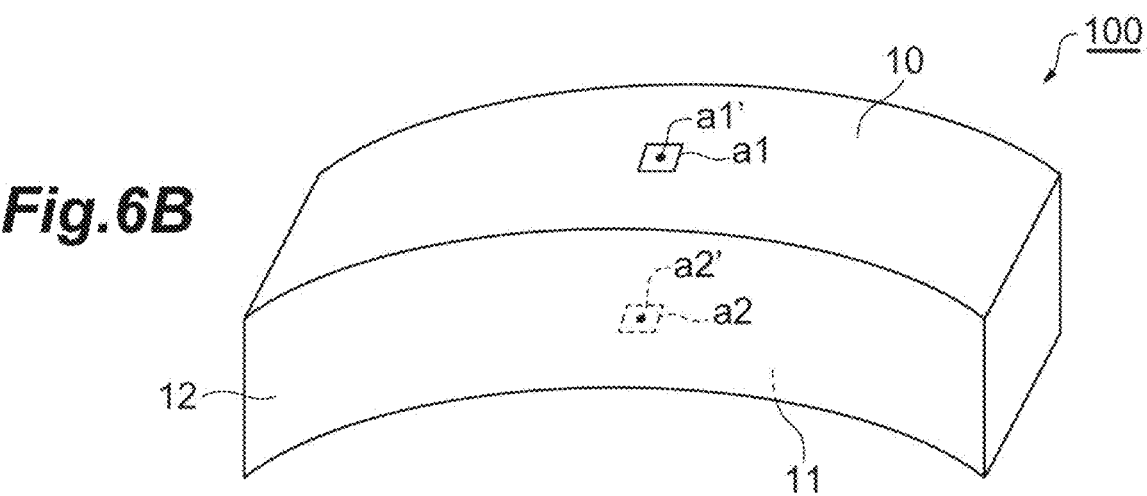
FIG. 6B is a schematic view showing a rare earth permanent magnet according to a modification of the present invention.

For instance, FIG. 6B shows a shape in which a part of a cylinder having a predetermined thickness is cut out at two faces along the axial direction, and the outer peripheral surface of the cylinder is disposed on the first surface 10 and the inner peripheral surface of the cylinder is disposed on the second surface 11, and this shape is also called C shape or arch shape.

Even when the first surface 10 is a curved surface, the central portion a1 is provided in a portion including the center of gravity a1' of the curved surface, and even when the second surface 11 is a curved surface, the central portion a2 is provided in a portion including the center of gravity a2' of the second surface 11, and a coordinate system is given in which the normal line of the center of gravity a1' extends in the Z direction, and arbitrary directions are defined as the X and Y directions, so that the end portions b1 to e1 and the end portions b2 to e2 can be determined.

Figure 6C:
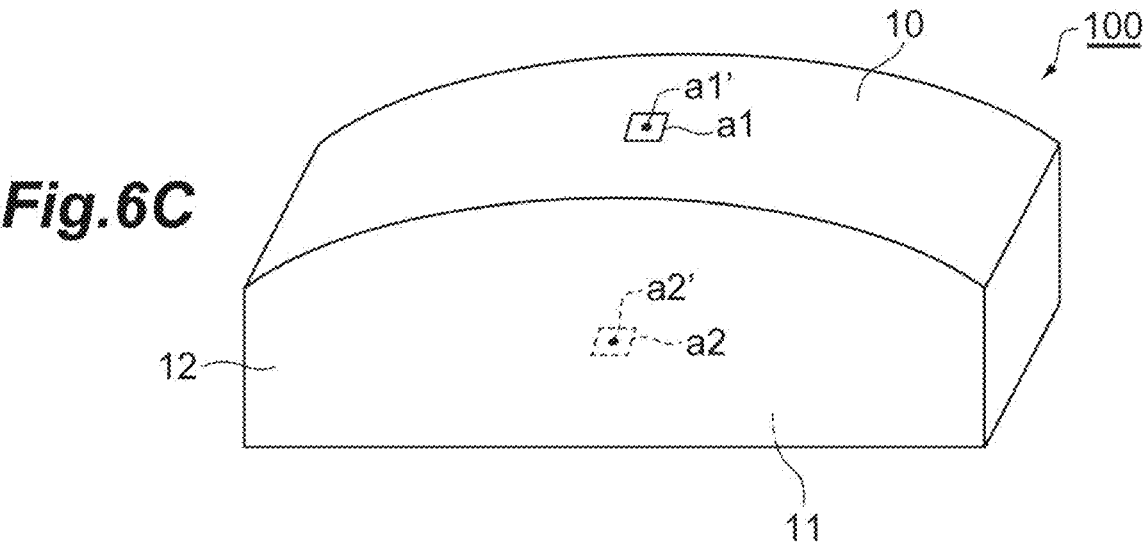
FIG. 6C is a schematic view showing a rare earth permanent magnet according to a modification of the present invention.

FIG. 6C shows the second surface 11 in FIG. 6B as a plane surface, and the central portions a1 and a2, the end portions b1 to e1, and the end portions b2 to e2 can be determined in the same manner.

When the magnet has a curved surface, the shape of the chip can be accordingly made have a curved surface.

<Method of Manufacturing Rare Earth Permanent Magnet>

A method of manufacturing the magnet 100 according to this embodiment (hereinafter, also referred to as "manufacturing method of this embodiment") will now be explained. The magnet 100 taken as an example below is supposed to be fabricated by the powder metallurgy method and has the grain boundary diffusion of a heavy rare earth element; however, the manufacturing method of this embodiment is not limited to a particular method and can be replaced with another method.

The manufacturing method of this embodiment includes a molding step of molding raw material powder to obtain a compact, a sintering step of sintering the compact to obtain a sintered body, and a grain boundary diffusion step of causing grain boundary diffusion of a heavy rare earth element into grain boundaries.

[Step of Preparing Raw Material Powder]

The raw material powder can be produced by a known method. The manufacturing method of this embodiment will be described assuming that the one-alloy method that uses a single alloy is used, but a so-called two-alloy method in which two alloys of a first alloy and a second alloy are mixed to produce the raw material powder.

First, a raw material metal related to the composition of the magnet 100 is melted by a known method, and casted to obtain an alloy having a desired composition.

After the alloy is produced, the produced alloy is pulverized (pulverization step). The pulverization step may be performed in two steps or one step. The pulverization method is not limited to a particular method. For example, a method using various crushers is used.

[Molding Step]

In the molding step, the pulverized powder obtained in the pulverization step is molded into a predetermined shape. Although the molding method is not limited to a particular method, in this embodiment, the pulverized powder is loaded into a mold and compressed under a magnetic field.

The compression for molding may be performed at 20 MPa to 300 MPa. The applied magnetic field may be 950 kA/m to 1600 kA/m. The shape of the compact obtained by molding the pulverized powder is not limited to a particular one, and may be any shape such as a rectangular parallelepiped, flat plate, column, or arch shape depending on the desired shape of the magnet 100.

[Sintering Step]

The sintering step is a step of sintering the compact in a vacuum or an inert gas atmosphere to obtain a sintered body. Although the sintering temperature needs to be adjusted according to various conditions such as composition, pulverization method, and difference in particle size and particle size distribution, the compact is heated and sintered, for example, in vacuum or in the presence of an inert gas at a temperature of 1000° C. or more and 1200° C. or less for one hour or more and 20 hours or less. As a result, a high density sintered body can be obtained. At this time, the coercive force distribution may be substantially uniform throughout the sintered body.

[Grain Boundary Diffusion Step]

In this step, a coating material containing a heavy rare earth element is applied to the sintered body obtained in the sintering step, which is in turn subjected to heat treatment for causing grain boundary diffusion of the heavy rare earth element from the coating material into the magnet.

Referring to FIG. 7 and FIGS. 8A to 8E, the case where a coating material is applied to the sintered body 50 of a rectangular parallelepiped having a first surface 60, a second surface 61, and end surfaces 62 to 65 corresponding to the first surface 10, the second surface 11, and the end surfaces 12 to 15 of the final product magnet will now be described.

Figure 7:
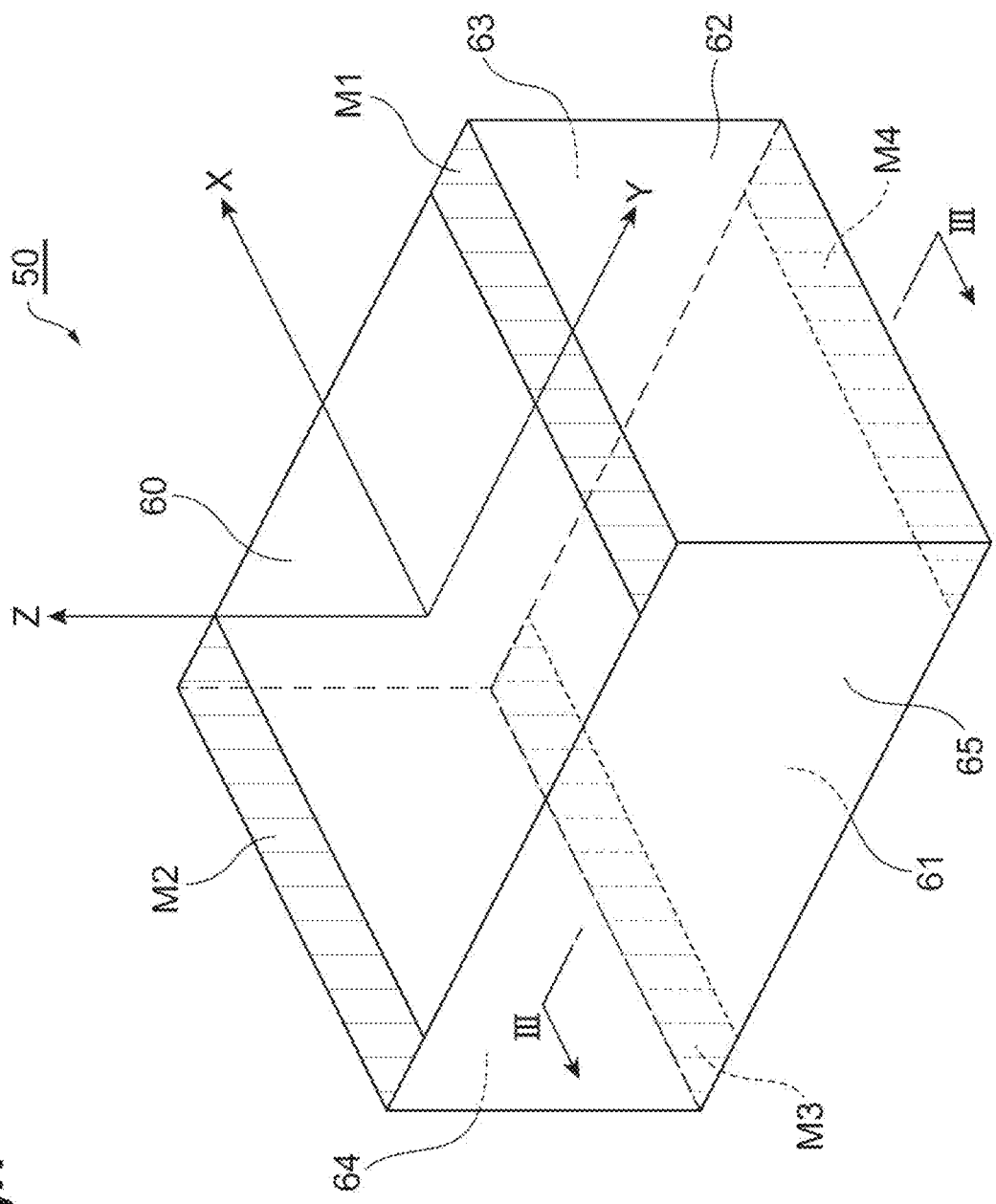
FIG. 7 is a perspective view showing a sintered body to which a coating material is to be applied.
Figure 8A:
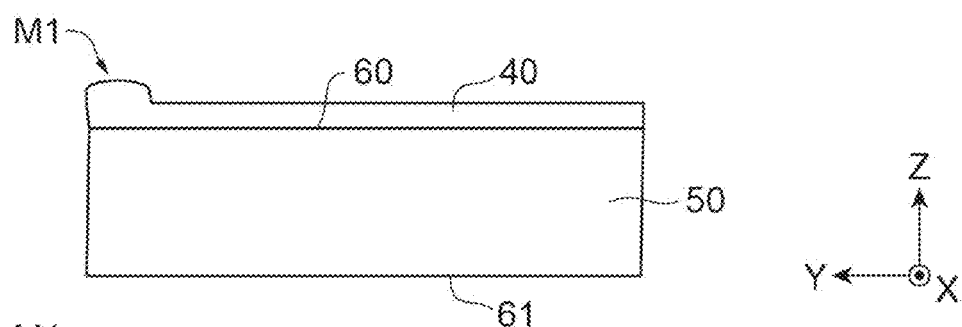
FIG. 8A is a schematic view showing a ZY cross section of the sintered body with the coating material applied on it before a diffusion treatment step in a process for manufacturing the rare earth permanent magnet according to the first embodiment.

In order to provide the coercive force distribution in the first embodiment (FIGS. 3A and 4A), in FIGS. 7 and 8A, from −Y side to +Y side or from +Y side to −Y side, a coating material 40 is applied to the entire first surface 60. Afterwards, the coating material is applied twice only to the end portion M1 on the +Y side so that the coating material 40 in the end portion M1 on the +Y side is made thicker than the other portion of the first surface 60.

As shown in FIG. 8A, when viewed from the X direction, the amount of coating material 40 per unit area is large in the end portion M1 on the +Y side, so that a large amount of heavy rare earth element is diffused from the end portion M1, which results in the coercive force distribution shown in FIG. 3A. Since the coating material is applied in the +Y direction or −Y direction, the amount of coating material per unit area at both ends on the +X side is equal to or smaller than that in the central portion when viewed from the Y direction, which results in the coercive force distribution shown in FIG. 4A.

It is not necessary to apply the coating material to the end faces 62 to 65.

Figure 8B:
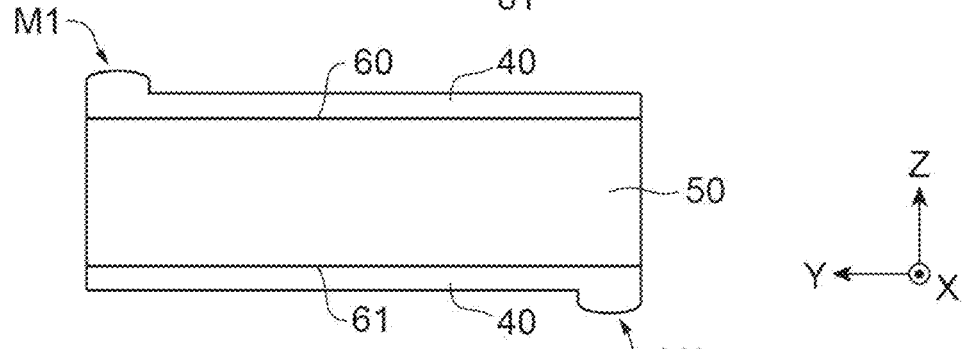
FIG. 8B is a schematic view showing a ZY cross section of the sintered body with the coating material applied on it before a diffusion treatment step in a process for manufacturing the rare earth permanent magnet according to the second embodiment.

In order to provide the coercive force distribution in the second embodiment (FIGS. 3B and 4B), as shown in FIG. 8B, the coating material may be applied to the entire first surface 60 of the sintered body 50, and the coating material may then be applied to the entire second surface 61. At this time, the coating material 40 containing a diffusing material is applied to the entire second surface 61 from the −Y side to the +Y side or from the +Y side to the −Y side in FIG. 7. Afterwards, the coating material 40 is applied only to the end portion M3 on the −Y side of the second surface 61 twice to make the coating material 40 thick in the end portion M3 on the −Y side. For the first surfaces 60, as described in the first embodiment, the coating material is applied twice only to the end portion M1 on the +Y side so that the coating material 40 in the end portion M1 on the +Y side is made thicker than the other portion of the first surface 60. In response to this, the coercive force distribution in the second embodiment (FIGS. 3B and 4B) is provided.

Figure 8C:
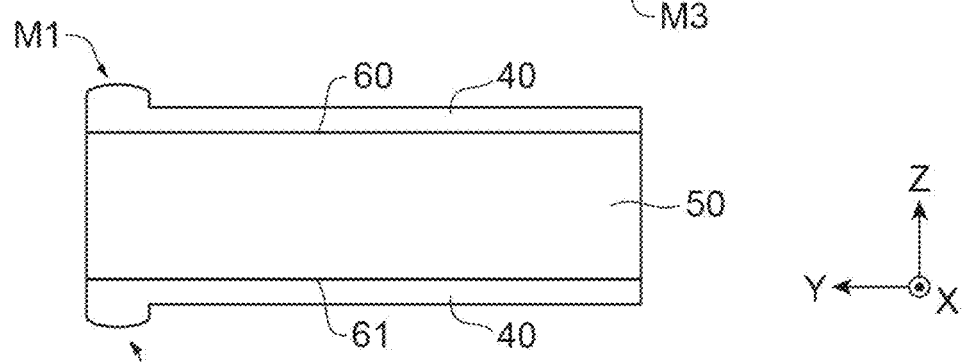
FIG. 8C is a schematic view showing a ZY cross section of the sintered body with the coating material applied on it before a diffusion treatment step in a process for manufacturing the rare earth permanent magnet according to the third embodiment.

Further, in order to provide the coercive force distribution in the third embodiment (FIGS. 3C and 4B), after the coating material is applied to the entire first surface 60 of the sintered body 50, as shown in FIG. 8C, the coating material is applied only to the end portion M4 on the +Y side of the second surface 61 twice to make the coating material thick only in the end portion M4 on the +Y side. For the first surfaces 60, as described in the first embodiment, the coating material is applied twice only to the end portion M1 on the +Y side so that the coating material 40 in the end portion M1 on the +Y side is made thicker than the other portion of the first surface 60. In response to this, the coercive force distribution in the third embodiment (FIGS. 3C and 4B) is provided.

Figure 8D:
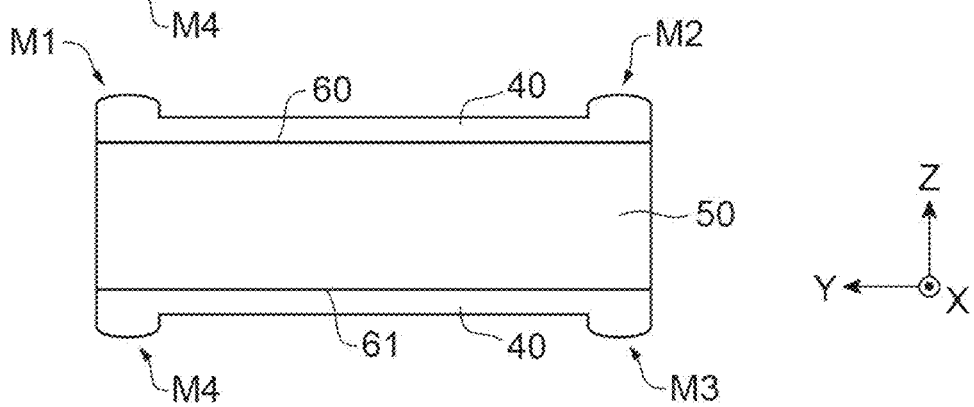
FIG. 8D is a schematic view showing a ZY cross section of the sintered body with the coating material applied on it before a diffusion treatment step in a process for manufacturing the rare earth permanent magnet according to the fourth embodiment.

Further, in order to provide the coercive force distribution in the fourth embodiment (FIGS. 3D and 4B), as shown in FIG. 8D, the coating material may be applied to the entire first surface 60 and the entire second surface 61 and, on each surface, the end portions on the +Y side and the −Y side, i.e., the end portions M1 to M4 may be coated twice to be made thick.

Figure 8E:
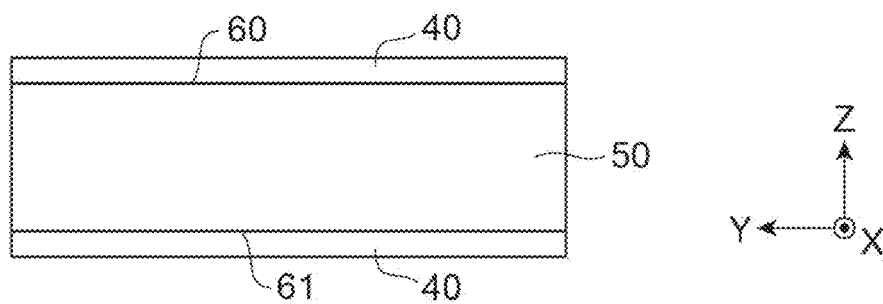
FIG. 8E is a schematic view showing a ZY cross section of the sintered body with the coating material applied on it before a diffusion treatment step in a process for manufacturing the rare earth permanent magnet according to the prior art.

As shown in FIG. 8E, on the first surface 60 and the second surface 61, only one-time coating gives the coercive force distribution shown in FIGS. 3E and 4B. In other words, in this case, the obtained magnet 100 does not satisfy A1<B1, A2<B2, A1<E1, and A2<E2.

The length in the Y direction of the end portion where the coating material is applied twice can be adjusted as appropriate, and can be, for example, 1 to 15 mm.

The heavy rare earth element contained in the coating material is not limited to a particular one, and may be Dy or Tb, may be Tb.

The heavy rare earth element contained in the coating material may be a heavy rare earth compound. Such a heavy rare earth compound is, for example, an alloy, oxide, halide, hydroxide, or hydride, and may be a hydride. Examples of the heavy rare earth element hydride include $DyH_2$, $TbH_2$, Dy—Fe hydride, and may be Tb—Fe hydride.

The heavy rare earth compound may be in the form of particles. The average particle size may be 100 nm to 100 μm, 1 μm to 50 μm.

The solvent used for the coating material may be one that can uniformly disperse the heavy rare earth compound without dissolving it. Examples include alcohols, aldehydes and ketones, and may be ethanol.

There is no limitation on the content of the heavy rare earth compound in the coating material. It may be 10 to 90 mass %, for example. The coating material may further contain a component other than the heavy rare earth compound as needed. Examples include a dispersant for preventing aggregation of particles of the heavy rare earth compound.

In the case of two-side coating, the amount (or density) of heavy rare earth element to be applied on the first surface 60 and the amount (or density) of heavy rare earth element to be applied on the second surface 61 may be variable.

There is no limitation on the method of applying the heavy rare earth element. Examples include methods using vapor deposition, sputtering, electrodeposition, spray coating, brush coating, jet dispensers, nozzles, screen printing, squeegee printing, sheet method and the like. In order to apply the heavy rare earth element only to the surface, the surface other than the surface may be masked as needed.

After the coating material containing the heavy rare earth element is applied, the coating material is dried and the heavy rare earth element is then diffused into the sintered body. Although there is no limitation on the method of diffusion treatment, the diffusion treatment is generally carried out by heating in vacuum or in an inert gas. In the aforementioned example, coating is taken as an example; however, the same applies to the adhesion of the heavy rare earth element by a method other than coating.

Which of the aforementioned Type A, Type B, and Type C diffusions will be dominant depends on the diffusion treatment temperature and the composition and structure of the base material. As the diffusion processing temperature increases, Type A tends more to be dominant, and as the diffusion treatment temperature decreases, Type C tends more to be dominant. As described above, Type C may be dominant. Further, as the diffusion treatment temperature decreases, Type C tends more to be dominant, but as the diffusion treatment temperature decreases, the diffusion rate also decreases, so that the heating may require longer time and the manufacturing efficiency may drop.

The diffusion treatment temperature according to this embodiment, which depends on the composition of the magnet 100, may be 700 to 1000° C. When the temperature is 700° C. or higher, the diffusion rate tends to be sufficiently high. When the temperature is 1000° C. or lower, Type C diffusion tends to be dominant.

When the amount of heavy rare earth element to be applied is the same, the coercive force obtained when grain boundary diffusion occurs at a temperature at which Type C diffusion is dominant tends to be higher than that obtained when grain boundary diffusion occurs at a temperature at which Type A or B diffusion is dominant.

[Processing Step (After Grain Boundary Diffusion)]

After the diffusion treatment step, treatment for removing the residue remaining on the surface may be performed as needed. There is no limitation on the type of processing performed in the processing step after the diffusion treatment. For instance, a chemical removal method, shaping such as physical cutting or grinding, or chamfering such as barrel polishing may be performed after the diffusion treatment.

The magnet 100 obtained through the above steps may be subjected to surface treatment such as plating, resin coating, oxidation treatment, or chemical conversion treatment. This can further improve the corrosion resistance.

In addition, magnets obtained by cutting and dividing the magnet 100 can be used. The magnet 100 may be used alone, or two or more magnets 100 may be combined for use as needed. There is no limitation on the combination method. Examples include a mechanical bonding method and a resin molding method.

To be specific, the magnet 100 may be used for applications such as a compressor, a magnetic sensor, a speaker, and a rotating electric machine described later.

Examples of the rotating electric machine include small-size motors, large-size motors, power generators, and IPM motors described later. Examples of power generators include wind power generators, hydraulic power generators, and thermal power generators. For applications that require particularly large-size rare earth permanent magnets such as large-size motors, wind power generators, and IPM motors, a large magnet 100 manufactured by combining two or more magnets 100 can be used.

<Rotating Electric Machine>

Figure 9:
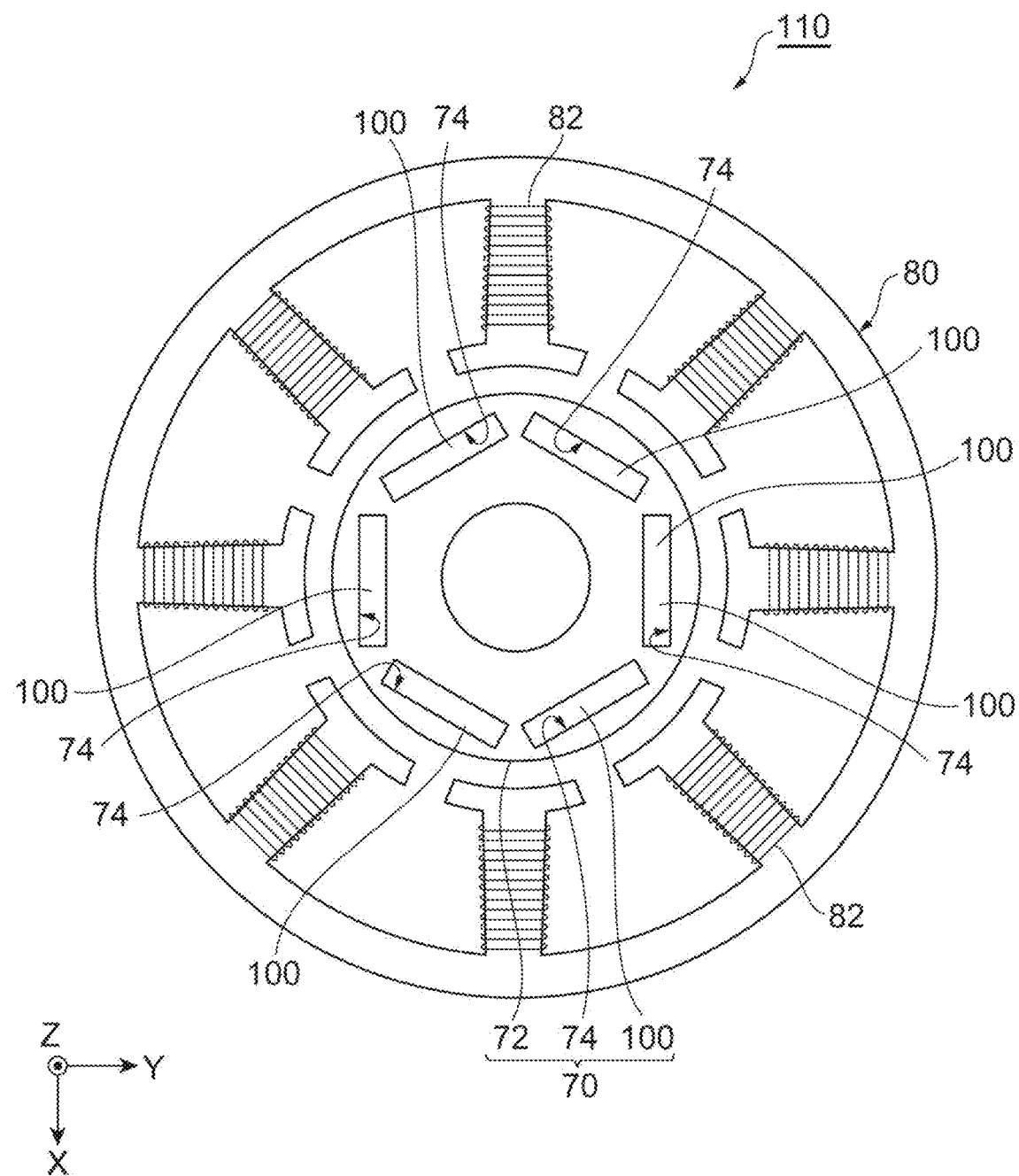
FIG. 9 is a schematic view showing an example of a rotating electric machine according to an embodiment of the present invention.

As shown in FIG. 9, magnets 100 may be used in the motor 110. The motor 110 shown in FIG. 9 is an IPM motor (interior permanent magnet motor). The motor 110 includes a cylindrical rotor 70 and a stator 80 disposed outside the rotor 70 and surround the rotor 70. FIG. 9 shows the internal structure of the motor 110 viewed from the rotation axis direction (Z direction) of the rotor 70. The rotor 70 has a cylindrical rotor core 72 and a plurality of magnets 100. A plurality of housing holes 74 are formed at predetermined intervals along the outer peripheral surface of the rotor core 72, and the magnets 100 are housed in the respective housing holes 74. In other words, the magnets 100 are disposed along the peripheral surface of the rotor core 72. The magnets 100 are fixed in the housing holes 74 by resin molding. In resin molding, high pressure is applied to the magnet 100.

As shown in FIG. 9, the magnets 100 that are adjacent to each other in the circumferential direction of the rotor 70 may be housed in the housing holes 74 so that the north pole and the south pole are opposite to each other. In other words, the magnets 100 adjacent to each other in the circumferential direction generate magnetic force lines opposite to each other in the radial direction of the rotor 70. Although the rotor 70 shown in FIG. 9 has six magnets 100, there is no limitation on the number of magnets 100 (number of poles) of the rotor 70.

Regarding the magnets 100, the Y direction in each magnet 100 may coincides with the direction of the rotation axis of the rotor 70. In particular, in the first embodiment, the end surface 12 on the end portion b1 side (+Y side) having a high coercive force may be exposed from the housing hole 74; and in the second to fourth embodiments, the end surface 12 on the end portion b1 side (+Y side) having a high coercive force or the end surface 14 on the end portion e1 side (−Y side) may be exposed from the housing hole 74. In each magnet 100 fixed in the housing hole 74, the exposed surface not surrounded by the inner wall of the housing hole 74 is likely to be corroded by water. Hence, when the magnet 100 is housed in such a direction, the surface not surrounded by the inner wall of the housing hole 74 is the side surface 12 having high corrosion resistance in the magnet 100, and the corrosion resistance of the motor is enhanced.

The stator 80 has a plurality of coil sections 82 provided at predetermined intervals along the outer peripheral surface of the rotor 70. The coil sections 82 and the magnets 100 are disposed so that they face each other. The stator 80 gives torque to the rotor 70 through an electromagnetic effect, and the rotor 70 rotates in the circumferential direction. Although the stator 80 shown in FIG. 9 has eight coil sections 82, there is no limitation on the number of coil sections 82 (number of slots) of the stator 80. Although the magnets are housed in the rotor in this embodiment, the magnets may be housed in the stator.

EXAMPLES

The present invention will now be described more in detail based on Examples and Comparative Examples, but the present invention is not limited to following Examples.

Example 1

[Sintering Step]

An alloy as a raw material was prepared by the strip casting method so that a sintered body satisfying 26 mass % Nd-4 mass % Pr-0.4 mass % Al-0.8 mass % Co-0.5 mass % Cu-0.35 mass % Zr-0.1 mass % Ga-0.90 mass % B-bal.Fe was obtained.

Next, the alloy as a raw material was subjected to occlusion of hydrogen at room temperature, and then to hydrogen pulverization treatment (coarse pulverization) under Ar atmosphere at 600° C. for one hour for dehydrogenation.

Next, 0.1 mass % of oleic acid amide as a pulverization aid was added to the coarsely pulverized powder after hydrogen pulverization and before fine pulverization, and was mixed using a Nauta mixer. Afterwards, fine pulverization was performed using a jet mill using $N_2$ gas, thereby providing finely pulverized powder with an average grain diameter of about 4.0 μm.

The obtained finely pulverized powder was injected into a mold disposed in the electromagnet and was then subjected to in-magnetic-field molding in which a pressure of 50 MPa was applied while a magnetic field of 1200 kA/m was applied, thereby producing a compact.

The obtained compact was sintered at 1060° C. for 12 hours to obtain a sintered body. Afterwards, the obtained sintered body was surface-polished, cut, cleaned, and dried to finally obtain a sintered body having a size of 20.2× 100.2×6.2 mm.

Note that the residual magnetic flux density of the whole sintered body was 1390 mT, and the coercive force of the whole sintered body was 1281 kA/m.

[Diffusion Treatment Step]

The pretreatment of the diffusion treatment step was performed by immersing the obtained sintered body in a mixed solution of nitric acid and ethanol for 3 minutes and then in ethanol for one minute twice. After the pretreatment, the sintered body was cleaned and dried.

A Tb-containing coating material to be applied to the sintered body was prepared. A $TbH_2$ raw material was finely pulverized using a jet mill using $N_2$ gas to prepare $TbH_2$ fine powder. The obtained $TbH_2$ fine powder was mixed with an alcohol solvent and dispersed in the alcohol solvent to form a coating material, whereby a Tb-containing coating material was obtained.

The Tb-containing coating material was applied to the entire two main surfaces of the sintered body by brushing in the +Y direction on the first surface 60 and in the -Y direction on the second surface 61. The coating material was again applied to an end portion (the end portion M1 in FIG. 7) on the +Y side of one surface, the first main surface 60 of the sintered body, and an end portion (the end portion M3 in FIG. 7) of the other surface, the second surface 61 of the sintered body. At this time, the coating material was applied so that the adhesion density of Tb was 30 mg/cm² in the end portions M1 and M3 of FIG. 7 where the coating material was applied twice. The coating material was applied so that the adhesion density of Tb was 20 mg/cm² in the areas of the two main surfaces where the coating material was applied once. At this time, the amount of Tb adhered on the entire base material is 1.0 mass % based on 100 mass % of the weight of the base material.

The sintered body coated with the Tb-containing coating material was dried and then subjected to diffusion treatment. The diffusion temperature was 850° C. and the diffusion time was six hours. The diffusion-treated sintered body was then subjected to aging treatment at 500° C.

All the six surfaces of the sintered body after the diffusion treatment step were subjected to 0.1-mm cutting and polishing. As a result, the size of the sintered body was 20 mm in the X direction×100 mm in the Y direction×6 mm in the Z direction. The sintered body after polishing was cleaned and dried to obtain a sample (magnet).

Example 2

A sample (magnet) was obtained in the same manner as in Example 1 except that in the end portions M1 and M3 of FIG. 7 where the coating material was applied twice, the coating material was applied so that the adhesion density of Tb became 31 mg/cm², and in the areas of the two main surfaces where the coating material was applied once, the coating material was applied so that the adhesion density of Tb became 22 mg/cm².

Comparative Example 1

A sample (magnet) was obtained in the same manner as in Example 1 except that in the diffusion treatment step, after the Tb-containing coating material was applied by brush coating to the entire two main surfaces of the sintered body, the coating material was not applied again to an end portion of one of the main surfaces of the sintered body (the end portion M1 in FIG. 7) and an end portion of the other main surface of the sintered body (the end portion M3 in FIG. 7).

The evaluation method of each characteristic will now be explained.

[Partial Coercive Force]

Figure 10A:
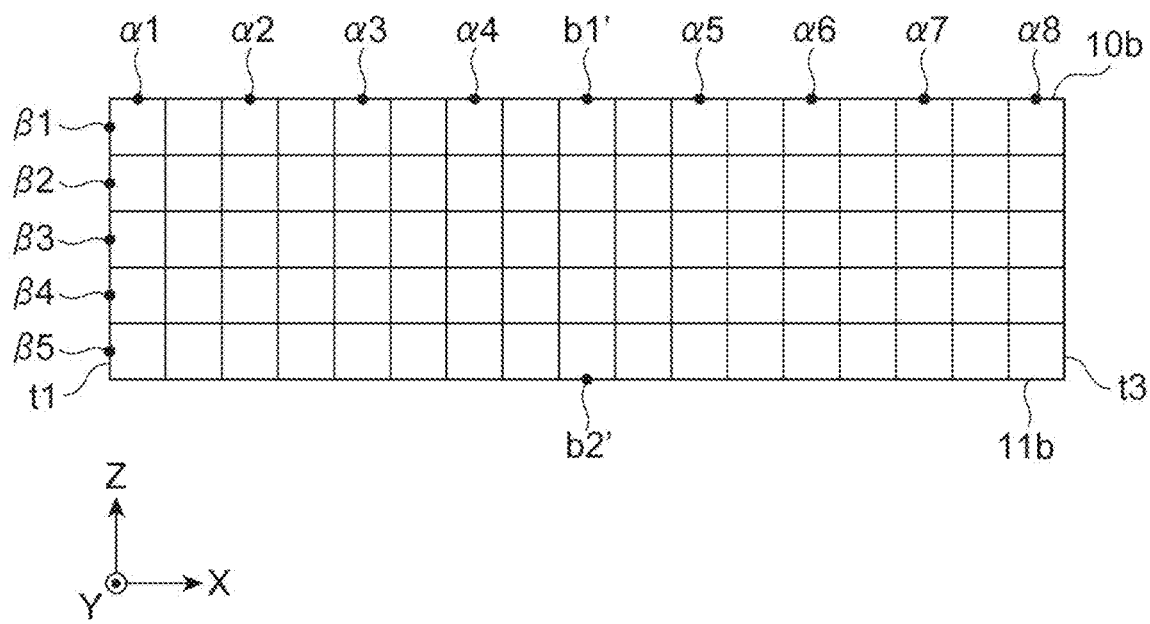
FIG. 10A is a schematic view showing the position and coordinates of the chip cut out for measuring the partial coercive force in the example.

First, chips having the side surface 12 of the magnet 100 shown in FIG. 1 were cut out from the magnet in the positions shown by the oblique lines in FIG. 10A. In this embodiment, the shape of the chip was a rectangular parallelepiped with X2=1 mm, Y2=5 mm, and Z2=1 mm shown in FIG. 5. The chips are disposed at equal intervals in the X direction and the Z direction. The position of each chip is represented by a combination of coordinates α1 to α8 and b1' in the Z direction and coordinates β1 to β5 in the Z direction.

Figure 10B:
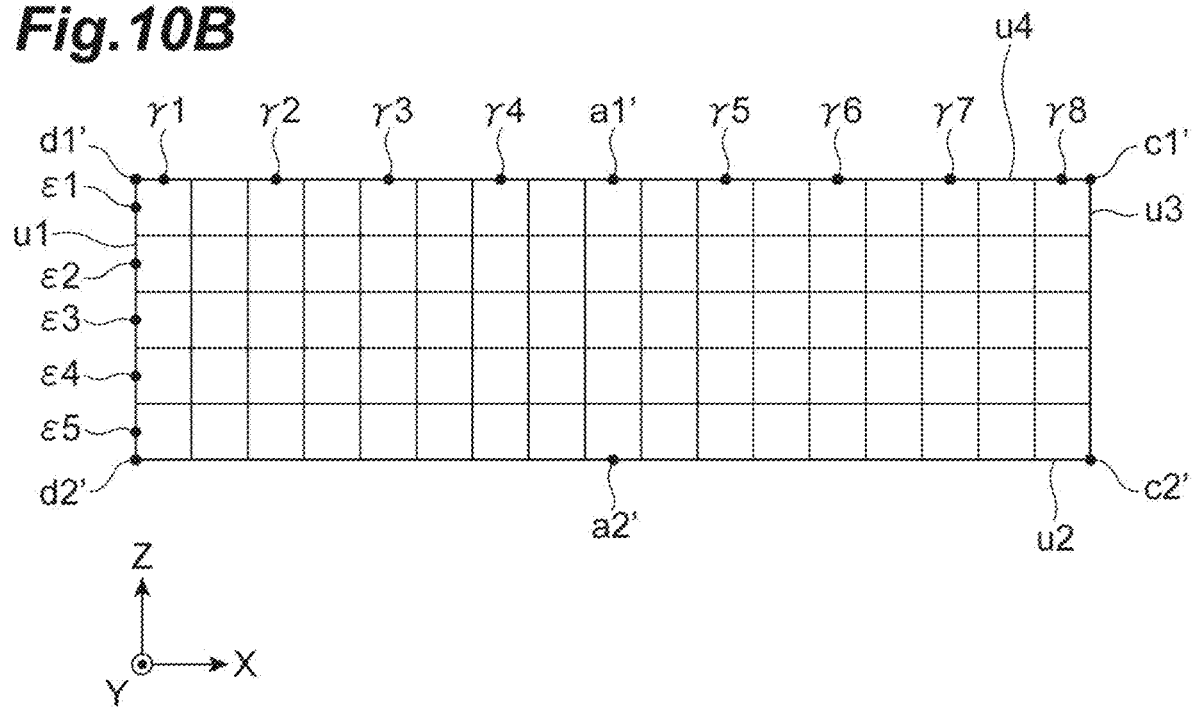
FIG. 10B is a schematic view showing the position and coordinates of the chip cut out for measuring the partial coercive force in the example.

Further, chips having the XZ plane where Y=0 in the magnet 100 shown in FIG. 1 and having the same sizes as described above were cut out from the magnet in the positions shown by the oblique lines in FIG. 10B. The chips are disposed at equal intervals in the X direction and the Z direction. The position of each chip is represented by a combination of coordinates γ1 to γ8 and a1' in the Z direction and coordinates ε1 to ε5 in the Z direction.

The coercive forces of the cut-out chips were measured by a pulse excitation magnetic characteristic measuring instrument. The results are shown in Table 1.

[Corrosion Resistance]

Figure 11:
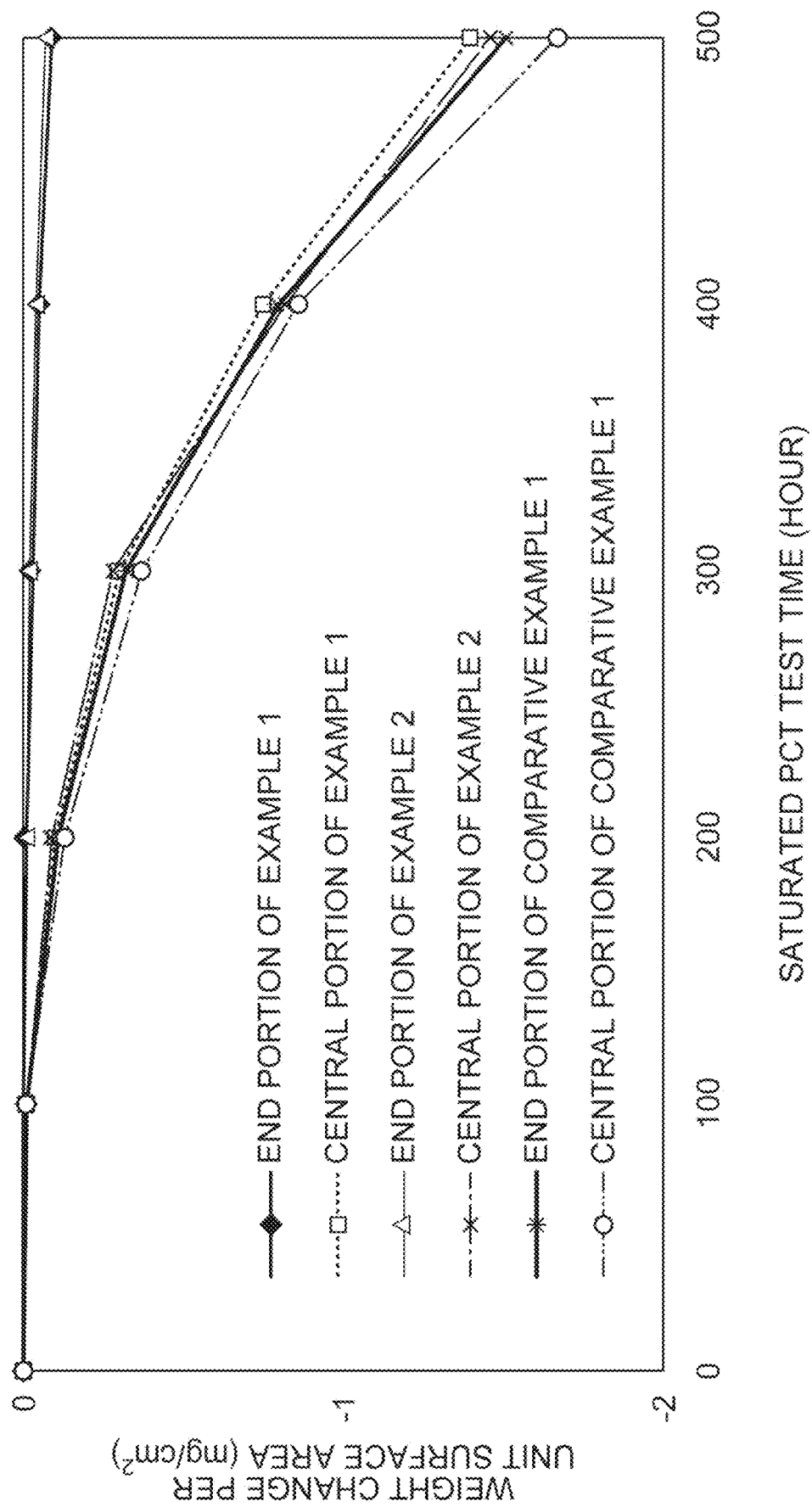
FIG. 11 is a graph showing the results of evaluation of corrosion resistance.

The end portion on the +Y side of the magnet and the central portion on the Y direction were cut out at a Y-axis length of 5 mm, and the pressure cooker test (PCT test) was performed. To be specific, a sample obtained at a temperature of 120° C., a humidity of 100% RH, and a pressure of 2 atm, and with the saturated PCT mode was left standing, and its weight per unit surface area was measured at regular test times. The weight was measured with an electronic balance. Table 2 shows the weight change (mg/cm²) from the weight before the start of the test (test time: 0 hour). FIG. 11 is a graph in which the abscissa represents the test time and the ordinate represents the weight change (mg/cm²) from the weight before the start of the test (test time: 0 hour).

TABLE 1

| | Partial coercive force (kA/m) | | | |
|---|---|---|---|---|
| Example 1 | Location | α1 | b1' | α8 |
| | β1 | 1673 | 1715 | 1678 |
| | β5 | 1658 | 1701 | 1663 |
| | Location | d1' | a1' | c1' |
| | β1 | 1645 | 1686 | 1639 |
| | β5 | 1638 | 1678 | 1642 |
| Example 2 | Location | α1 | b1' | α8 |
| | β1 | 1692 | 1740 | 1699 |
| | β5 | 1660 | 1712 | 1658 |
| | Location | d1 | a1' | c1' |
| | β1 | 1642 | 1697 | 1647 |
| | β5 | 1638 | 1690 | 1645 |
| Comparative Example 1 | Location | α1 | b1' | α8 |
| | β1 | 1648 | 1680 | 1639 |
| | β5 | 1639 | 1676 | 1644 |
| | Location | d1' | a1' | c1' |
| | β1 | 1644 | 1685 | 1649 |
| | β5 | 1638 | 1678 | 1640 |

TABLE 2

| | Measured spot | Elapsed time (hour) | | | | | |
|---|---|---|---|---|---|---|---|
| | | 0 | 100 | 200 | 300 | 400 | 500 |
| Example 1 | End portion | 0 | 0 | −0.01 | −0.03 | −0.05 | −0.09 |
| | Central portion | 0 | −0.01 | −0.1 | −0.3 | −0.75 | −1.4 |
| Example 2 | End portion | 0 | 0 | −0.01 | −0.02 | −0.04 | −0.07 |
| | Central portion | 0 | −0.01 | −0.09 | −0.28 | −0.82 | −1.46 |
| Comparative Example 1 | End portion | 0 | −0.01 | −0.11 | −0.32 | −0.8 | −1.51 |
| | Central portion | 0 | −0.01 | −0.13 | −0.37 | −0.86 | −1.67 |

Reference Signs List

10 . . . First surface, 11 . . . Second surface, 12-16 . . . Side surface (end surface), 21 . . . Grain boundary, 23 . . . Main phase crystal grain, 30 . . . Sample, 70 . . . Rotor, 80 . . . Stator, 100 . . . R-T-B-based sintered magnet, 110 . . . Motor

What is claimed is:

1. A rare earth permanent magnet having a first surface and satisfying $A1<B1$, $A1>C1$, $A1>D1$, $A1-C1 \geq 10$ kA/m, $A1-D1 \geq 10$ kA/m, and $B1-A1 \geq 10$ kA/m, where A1 is a coercive force of a portion a1 including a center of gravity of the first surface, and a surface of the portion a1 being the same surface as the first surface of the magnet, B1 is a coercive force of a portion b1 including an end of the first surface, the end being distant from the portion a1 in a Y direction perpendicular to a normal direction at the center of gravity of the first surface, and a surface of the portion b1 being the same surface as the first surface of the magnet, C1 is a coercive force of a portion c1 including an end of the first surface, the end being distant from the portion a1 in a X direction perpendicular to the normal direction at the center of gravity of the first surface, the X direction perpendicular to the Y direction, and a surface of the portion c1 being the same surface as the first surface of the magnet, and D1 is a coercive force of a portion d1 including an end of the first surface, the end being distant from the portion a1 in the −X direction opposite to the X direction, and a surface of the portion d1 being the same surface as the first surface of the magnet, wherein a heavy rare earth element is present on a top layer of the first surface, and a size of each of the portion a1, the portion b1, the portion c1, and the portion d1 is 0.5 to 10 mm×0.5 to 10 mm×0.5 to 10 mm.

2. The rare earth permanent magnet according to claim 1, further comprising:

a second surface facing the first surface, the second surface having a top layer containing a heavy rare earth element, wherein the magnet satisfies $A2>C2$ and $A2 \geq D2$ where A2 is a coercive force of a portion a2 including a center of gravity of the second surface, and a surface of the portion a2 being the same surface as the second surface of the magnet, C2 is a coercive force of a portion c2 including an end of the second surface, the end being distant from the portion a2 including the center of gravity of the second surface, in the X direction, and a surface of the portion c2 being the same surface as the second surface of the magnet, D2 is a coercive force of a portion d2 including an end of the second surface, the end being distant from the portion a2 including the center of gravity of the second surface, in the −X direction, and a surface of the portion d2 being the same surface as the second surface of the magnet, and a size of each of the portion a2, the portion c2, and the portion d2 is 0.5 to 10 mm×0.5 to 10 mm×0.5 to 10 mm.

3. The rare earth permanent magnet according to claim 2, wherein the magnet satisfying $A2<B2$ where B2 is a coercive force of a portion b2 including an end of the second surface, the end being distant from the portion a2 including the center of gravity of the second surface, in the Y direction, and a surface of the portion b2 being the same surface as the second surface of the magnet, and a size of the portion b2 is 0.5 to 10 mm×0.5 to 10 mm×0.5 to 10 mm.

4. The rare earth permanent magnet according to claim 2, wherein the magnet satisfying $A2<E2$ where E2 is a coercive force of a portion e2 including an end of the second surface, the end being distant from the portion a2 including the center of gravity of the second surface, in a −Y direction opposite to the Y direction, and a surface of the portion e2 being the same surface as the second surface of the magnet, and a size of the portion e2 is 0.5 to 10 mm×0.5 to 10 mm×0.5 to 10 mm.

5. The rare earth permanent magnet according to claim 1, wherein the magnet satisfying $A1<E1$ where E1 is a coercive force of a portion e1 including an end of the first surface, the end being distant from the portion a1 including the center of gravity of the first surface, in the −Y direction opposite to the Y direction, and a surface of the portion e1 being the same surface as the first surface of the magnet, and a size of the portion e1 is 0.5 to 10 mm×0.5 to 10 mm×0.5 to 10 mm.

6. The rare earth permanent magnet according to claim 1, wherein the Y direction is a longitudinal direction of the first surface.

7. The rare earth permanent magnet according to claim 1, wherein a normal direction at the center of gravity of the first surface is parallel to a magnetization easy axis of the rare earth permanent magnet.

8. A rotating electric machine comprising a rotor, a stator, and the rare earth permanent magnet according to claim 1 provided in the rotor or the stator.

* * * * *